(12) United States Patent
Ebe

(10) Patent No.: US 11,487,050 B2
(45) Date of Patent: Nov. 1, 2022

(54) OBSERVATION OPTICAL SYSTEM AND OBSERVATION APPARATUS INCLUDING SAME

(71) Applicant: CANON KABUSHIKI KAISHA, Tokyo (JP)

(72) Inventor: Hiroki Ebe, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 139 days.

(21) Appl. No.: 16/445,526

(22) Filed: Jun. 19, 2019

(65) Prior Publication Data
US 2019/0302430 A1 Oct. 3, 2019

Related U.S. Application Data

(63) Continuation of application No. PCT/JP2017/045313, filed on Dec. 18, 2017.

(30) Foreign Application Priority Data

Dec. 21, 2016 (JP) .............................. JP2016-247731
Dec. 7, 2017 (JP) .............................. JP2017-234844

(51) Int. Cl.
*G02B 3/08* (2006.01)
*G02B 13/18* (2006.01)
(Continued)

(52) U.S. Cl.
CPC ............... *G02B 3/08* (2013.01); *G02B 13/18* (2013.01); *G02B 25/00* (2013.01); *G02B 27/02* (2013.01); *G02B 27/0172* (2013.01)

(58) Field of Classification Search
CPC .......... G02B 3/08; G02B 13/18; G02B 27/02; G02B 25/00; G02B 27/0172
See application file for complete search history.

(56) References Cited

U.S. PATENT DOCUMENTS 6,101,035 A * 8/2000 Maruyama ................ G02B 9/14
359/558
6,130,785 A * 10/2000 Abe ....................... G02B 5/1895
359/570
(Continued)

FOREIGN PATENT DOCUMENTS

CN 107045196 A * 8/2017 ........... G02B 25/001
JP H0391708 A 4/1991
(Continued)

OTHER PUBLICATIONS

International Search Report dated Feb. 13, 2018 in corresponding International Patent Application No. PCT/JP2017/045313.
(Continued)

*Primary Examiner* — George G. King
(74) *Attorney, Agent, or Firm* — Carter, DeLuca & Farrell LLP

(57) ABSTRACT

An observation optical system according to the present invention includes a Fresnel lens and a lens LP with a positive refractive power provided on a light incident side or a light emitting side of the Fresnel lens. A length in a direction of an optical axis from a surface vertex of a central annular section of the Fresnel lens to an end portion of the central annular section is defined as h0, and a length in the direction of the optical axis of a grating wall surface of a first annular section adjacent to the central annular section is defined as h1. The lengths h1 and h0 are set to appropriate values, respectively.

15 Claims, 13 Drawing Sheets

(51) Int. Cl.
  *G02B 25/00* (2006.01)
  *G02B 27/02* (2006.01)
  *G02B 27/01* (2006.01)

(56) References Cited

U.S. PATENT DOCUMENTS

| | | |
|---|---|---|
| 9,995,925 B2 | 6/2018 | Ebe |
| 2002/0003767 A1 | 1/2002 | Ota et al. |
| 2010/0024275 A1 | 2/2010 | Crandall |
| 2012/0243110 A1 | 9/2012 | Robinson |
| 2015/0362643 A1 | 12/2015 | Shimano et al. |
| 2017/0248769 A1* | 8/2017 | Stamenov ............ G02B 25/001 |
| 2018/0074318 A1* | 3/2018 | Wheelwright ........... G02B 3/08 |
| 2018/0081092 A1* | 3/2018 | Hudman .............. G02B 25/001 |
| 2018/0203205 A1* | 7/2018 | Cao .................... G02B 27/0172 |
| 2018/0231699 A1 | 8/2018 | Ebe |
| 2018/0275392 A1* | 9/2018 | Song ................. G02B 27/0025 |
| 2019/0285892 A1* | 9/2019 | Yang ................. G02B 27/0955 |

FOREIGN PATENT DOCUMENTS

| | | |
|---|---|---|
| JP | H05210054 A | 8/1993 |
| JP | H06138307 A | 5/1994 |
| JP | H07244246 A | 9/1995 |
| JP | H0829690 A | 2/1996 |
| JP | H08210054 A | 8/1996 |
| JP | H10186230 A | 7/1998 |
| JP | 2002122780 A | 4/2002 |

OTHER PUBLICATIONS

International Preliminary Report on Patentability issued by the International Bureau dated Jul. 4, 2019 in corresponding International Application No. PCT/JP2017/045313, with English translation.

Notice of Reasons for Refusal issued by the Japan Patent Office dated Nov. 24, 2021 in corresponding JP Patent Application No. 2017-234844, with English translation.

* cited by examiner

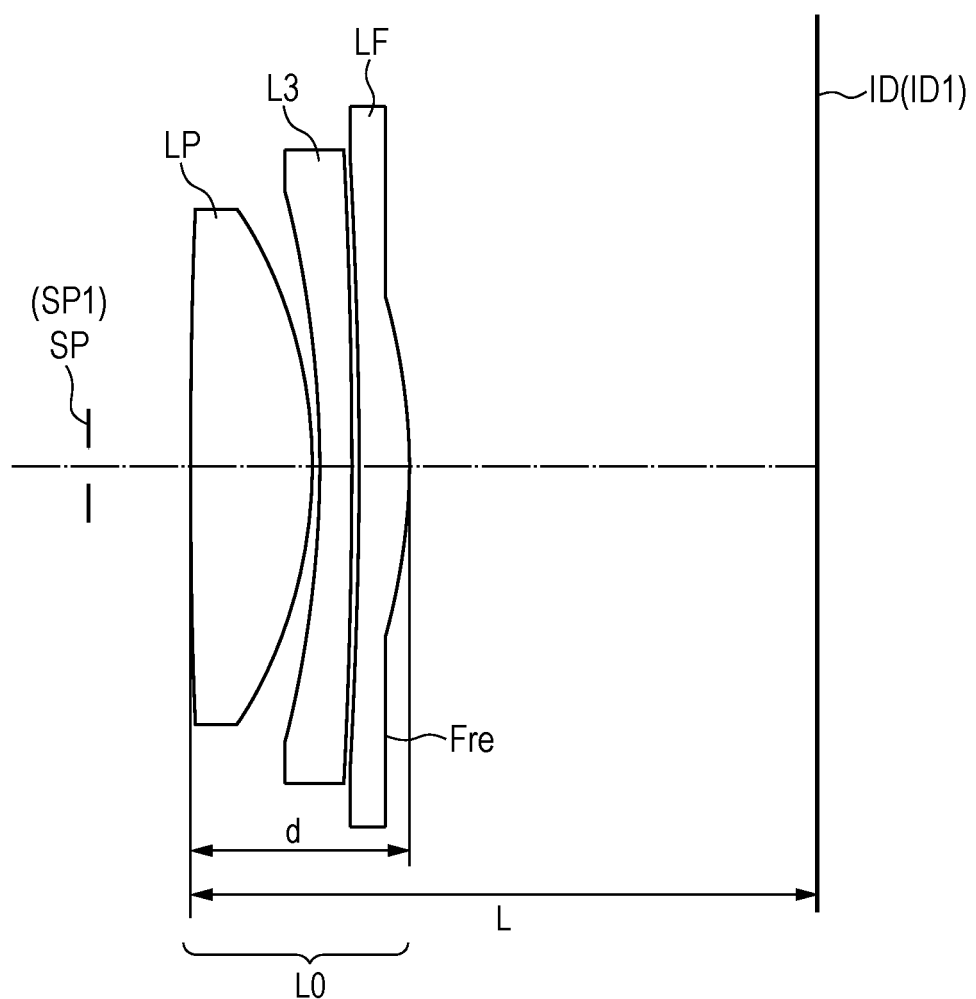

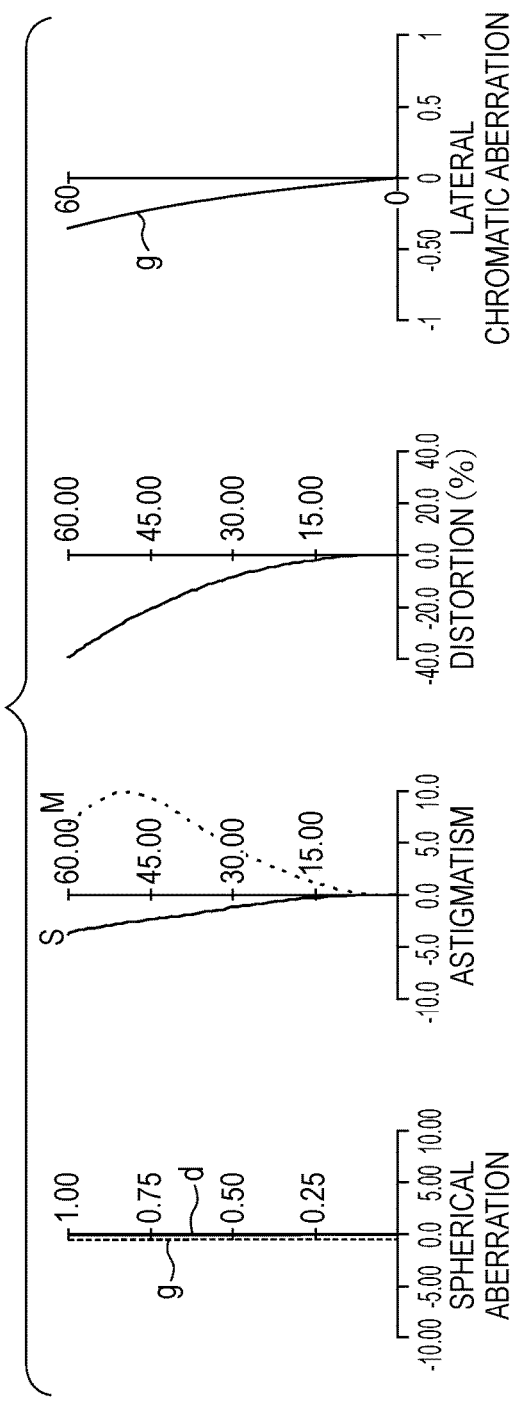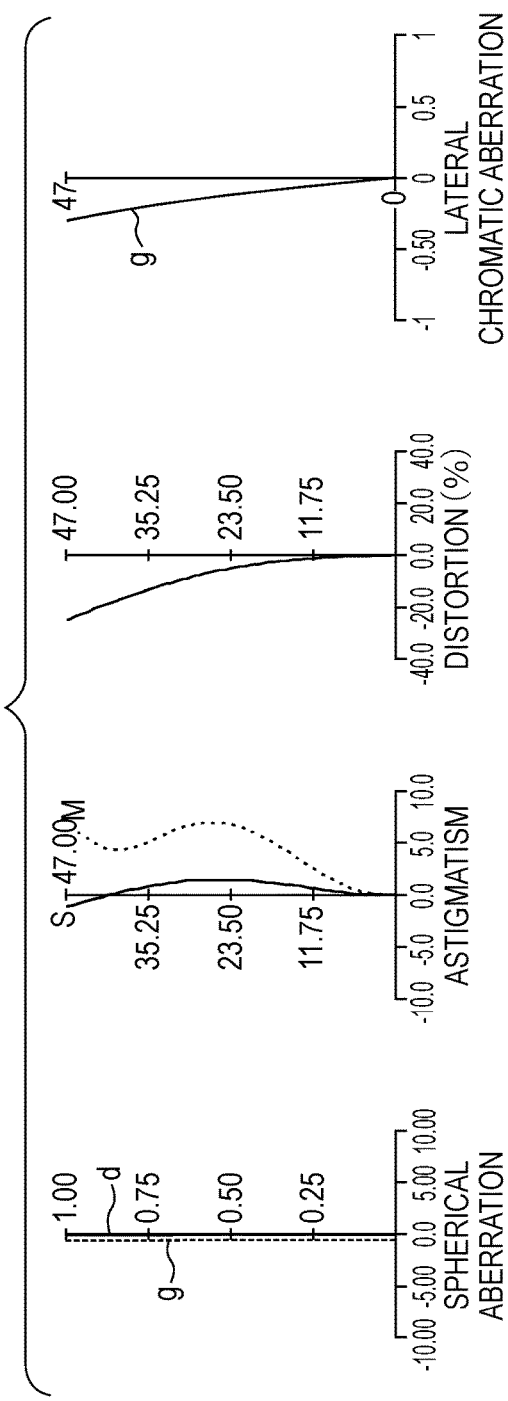

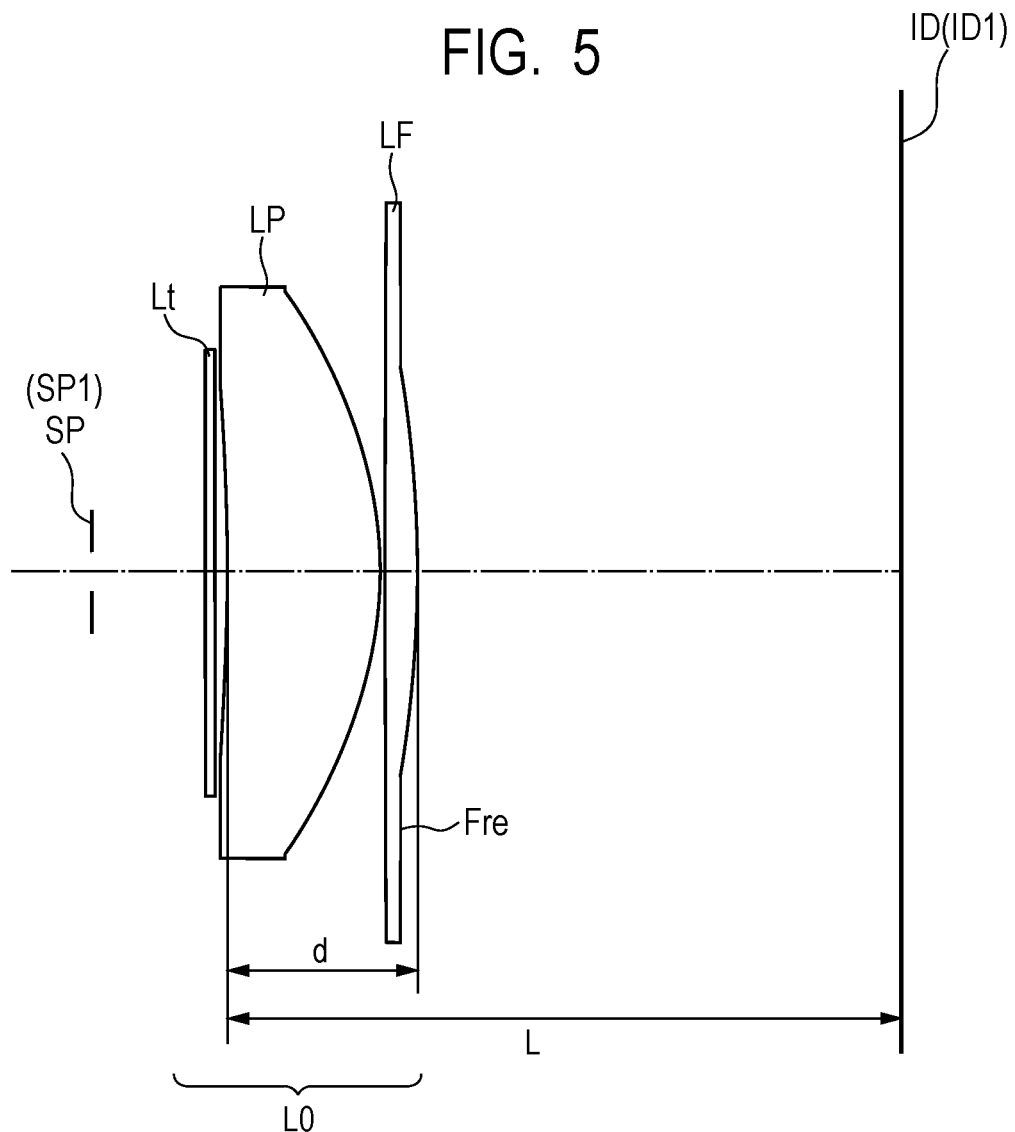

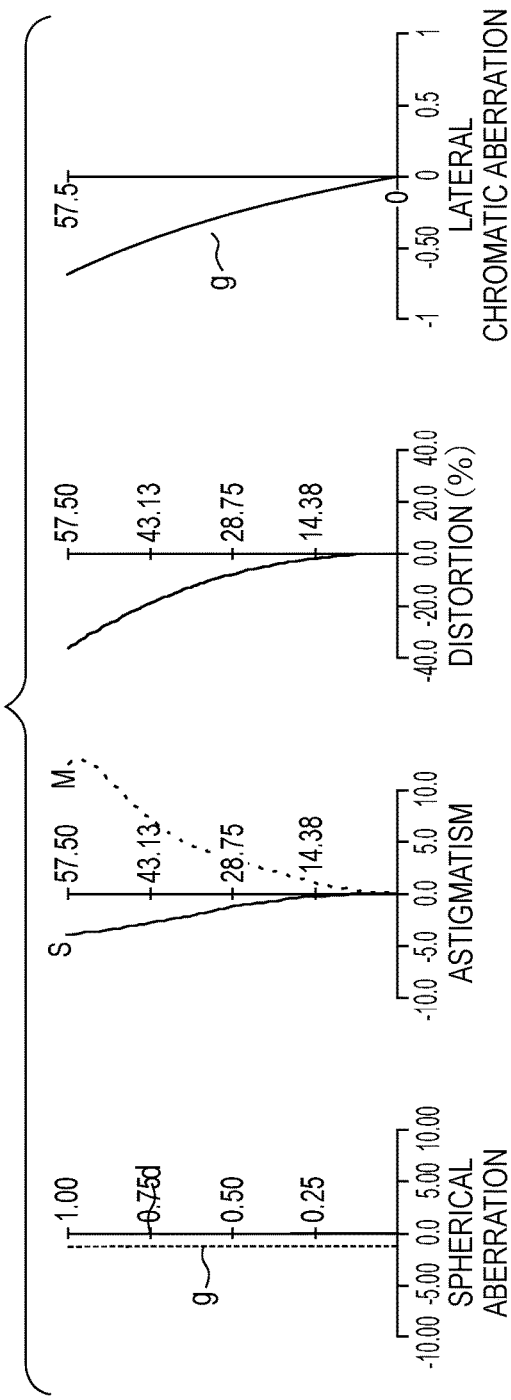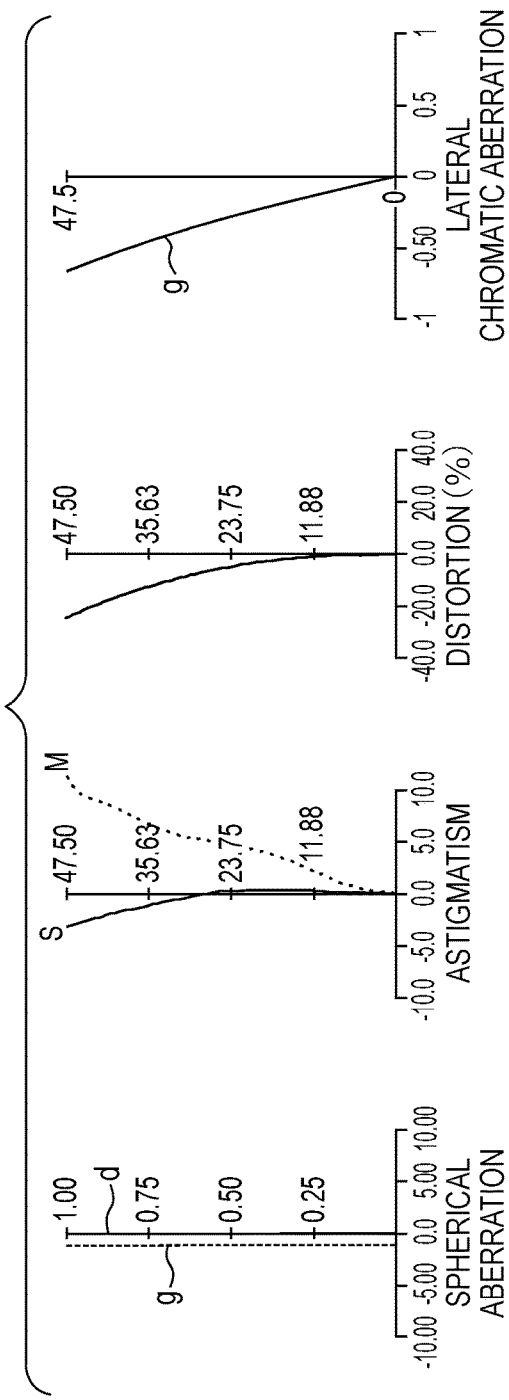

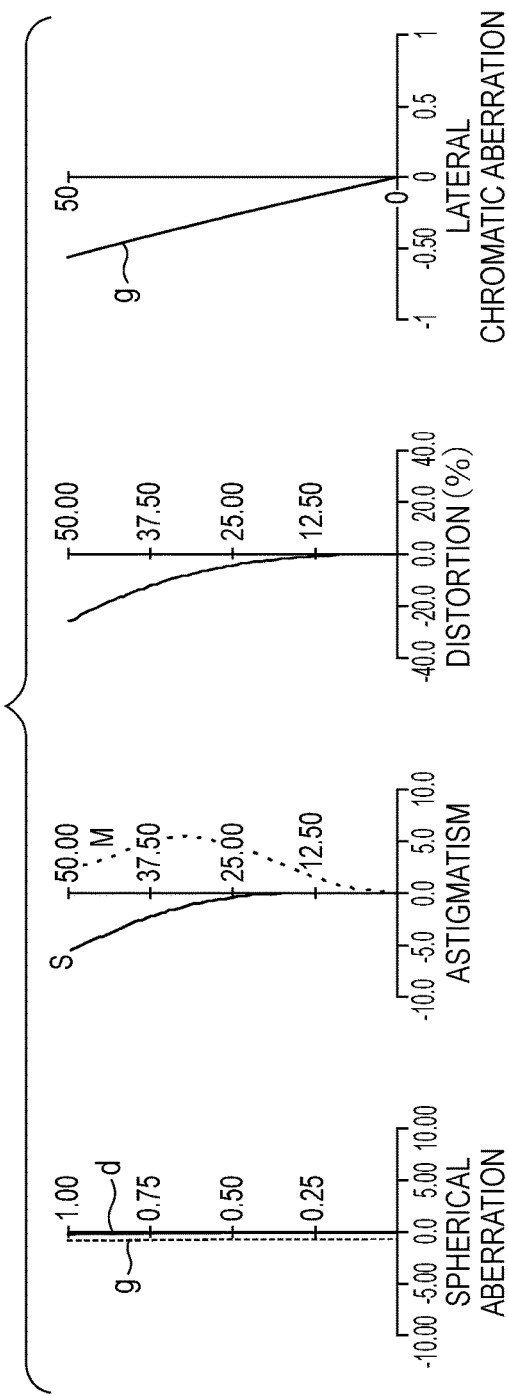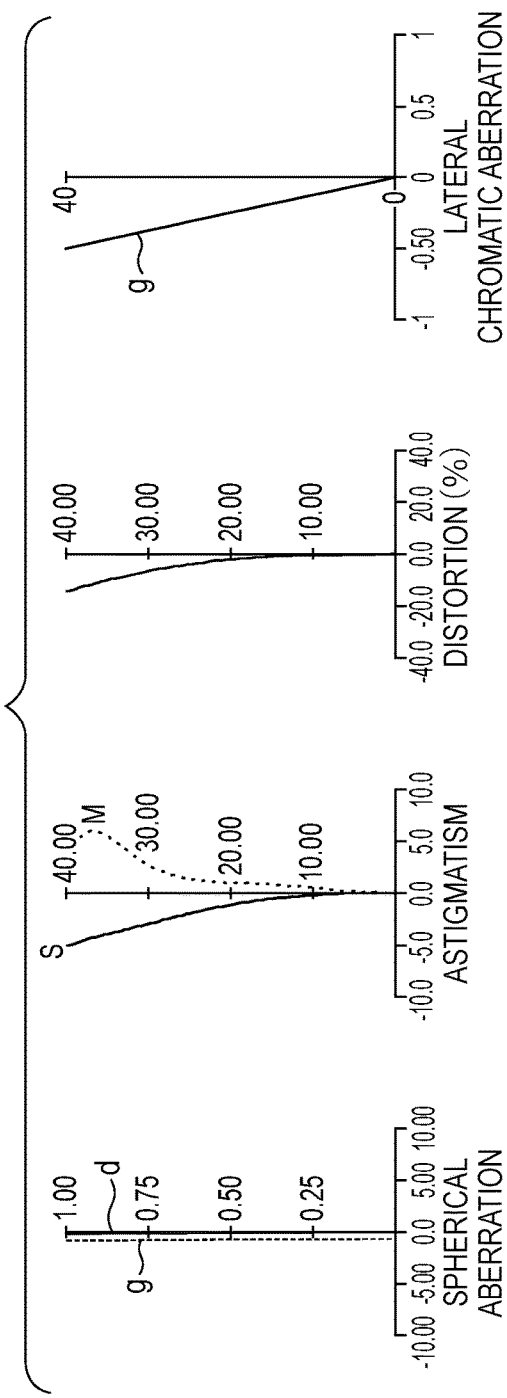

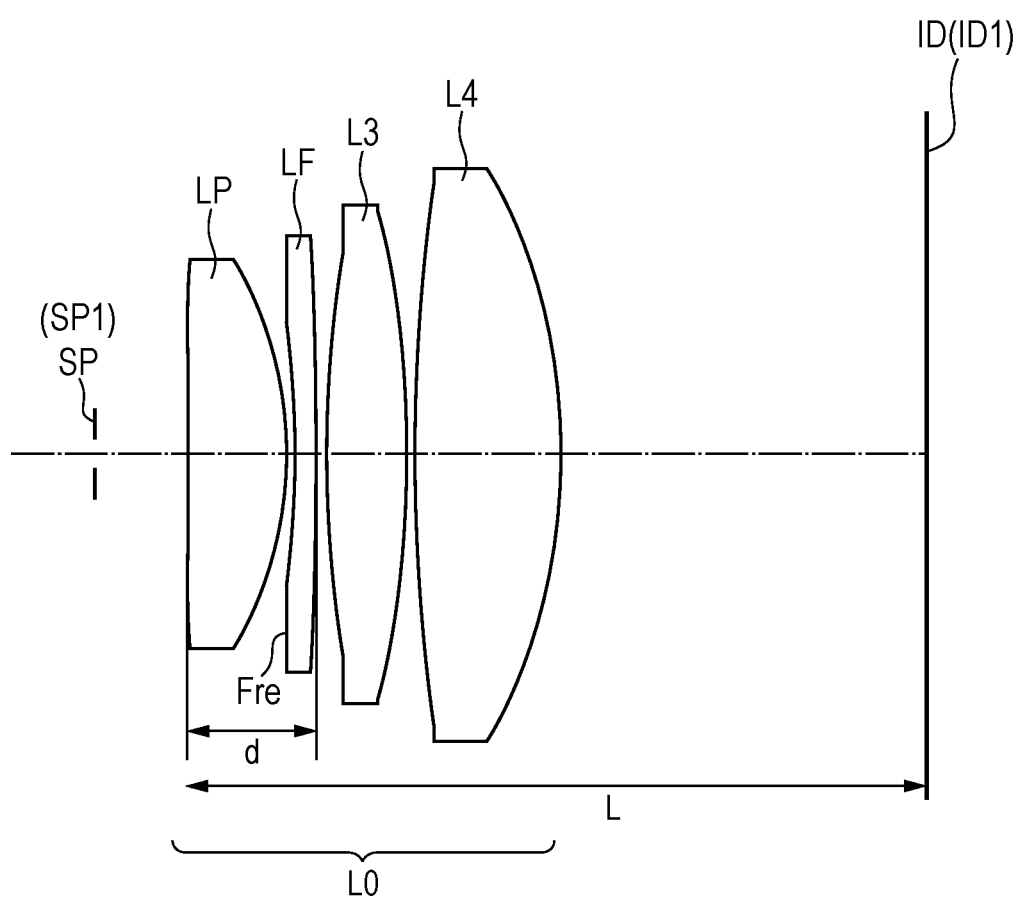

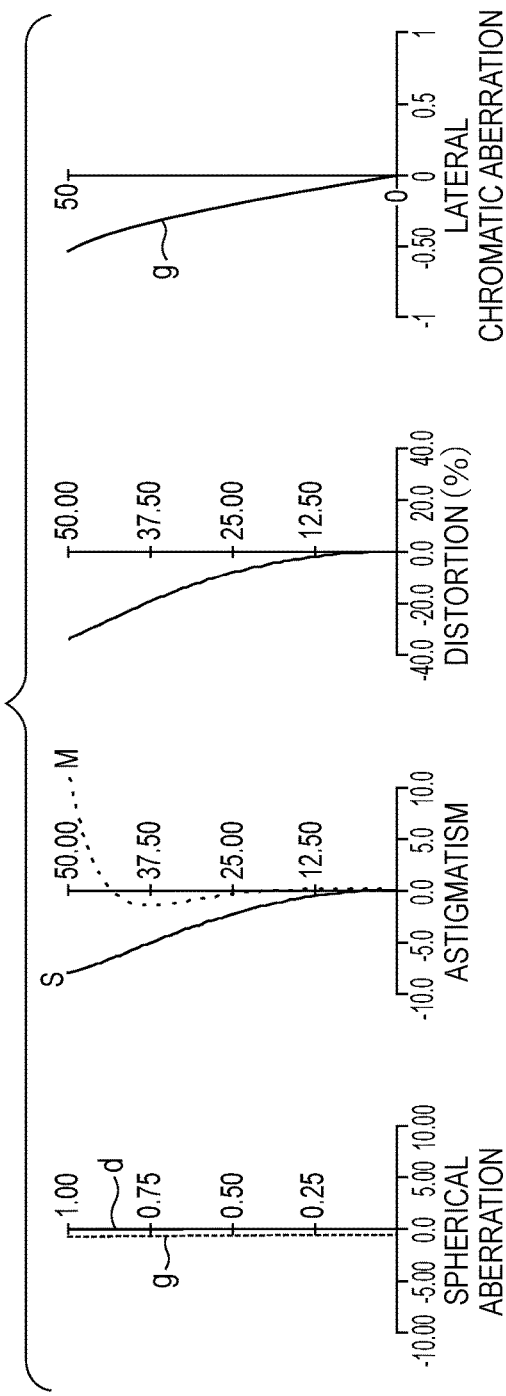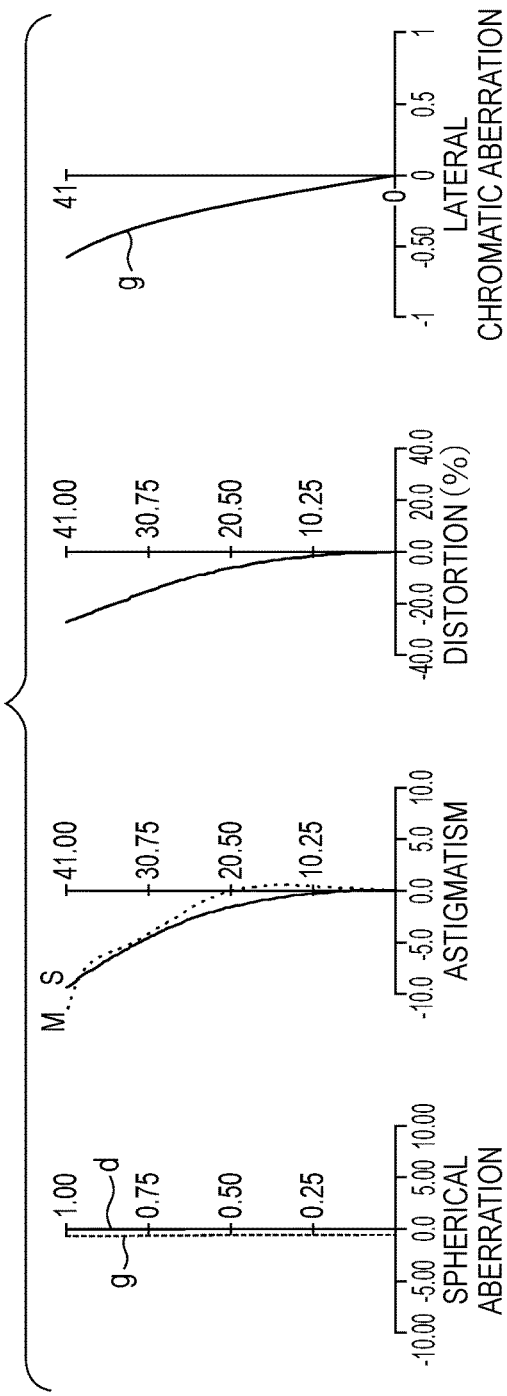

PRIOR ART

PRIOR ART

OBSERVATION OPTICAL SYSTEM AND OBSERVATION APPARATUS INCLUDING SAME

CROSS-REFERENCE TO RELATED APPLICATIONS

This application is a Continuation of International Patent Application No. PCT/JP2017/045313, filed Dec. 18, 2017, which claims the benefit of Japanese Patent Application No. 2016-247731, filed Dec. 21, 2016, and Japanese Patent Application No. 2017-234844, filed Dec. 7, 2017, the entire contents of which are hereby incorporated by reference herein in their entirety.

BACKGROUND OF THE INVENTION

Field of the Invention

The present invention relates to an observation optical system suitable for a head mount display unit and the like used for observing an enlarged image of an original image displayed on an image display element such as a liquid crystal display element.

Description of the Related Art

There has heretofore been proposed an observation apparatus such as a head mount display unit, which enables a user to perform observation with a sense of presence by using an observation optical system to enlarge an original image displayed on an image display element such as a CRT and an LCD, and providing the user with a large-screen image thus obtained. In recent years, such observation apparatuses have been facing an increasing demand for providing a higher sense of presence, and an observation optical system for use in such an observation apparatus has therefore been facing demands for supporting a wide viewing angle and for achieving a high optical performance. In addition, when the observation optical system is used in an observation apparatus of a head-coupled type or a handheld type, the observation optical system is desirably small in size and light in weight.

There has been known an eyepiece video display apparatus in which a Fresnel lens is arranged on an optical path serving as an observation optical system aiming to achieve a wide viewing angle and reduction in weight (Japanese Patent Application Laid-Open No. H07-244246). There has also been known an objective lens for an optical head in which a resin lens is used for reducing a weight of an observation optical system, and a primary diffraction effect is used by providing a diffractive lens structure around the resin lens to suppress a focal position deviation of the resin lens attributable to a temperature fluctuation (Japanese Patent Application Laid-Open No. 2002-122780).

In order to obtain an observation optical system having a high optical performance and a light weight as a whole while achieving a wide viewing angle, it is necessary to set an appropriate lens configuration. Especially when using a Fresnel lens, it is necessary to set the shape and the lens configuration of the Fresnel lens appropriately.

An eyepiece optical system according to Japanese Patent Application Laid-Open No. H07-244246 includes a Fresnel lens having a serrated shape and located at the closest position to the eye (an observation plane) while orienting its concave surface to an observation side. Thus, this eyepiece optical system aims to achieve a wide viewing angle and reduction in weight of the entire system. Fresnel gratings of the Fresnel lens according to Japanese Patent Application Laid-Open No. H07-244246 are prone to deteriorate its image quality when light is incident on a defectively formed part (a deformed surface) or the like of a wall surface or a projection of a grating of the lens because the incident light acts as unnecessary light (a ghost). In addition, the Fresnel lens according to Japanese Patent Application Laid-Open No. H07-244246 is designed to form a Fresnel surface starting from a central area of the Fresnel lens. As a consequence, this lens is prone to deteriorate image quality of an observed image in a central area of an observation plane which particularly draws attention of an observer.

The objective lens according to Japanese Patent Application Laid-Open No. 2002-122780 is designed to form a central region of the lens into a lens surface having a continuous profile so as to obtain a refraction effect and to form its surrounding portion into the serrated diffractive lens configuration in order to use the primary diffraction effect. In this way, the objective lens intends to suppress the focal position deviation attributable to the temperature fluctuation. However, the objective lens of Japanese Patent Application Laid-Open No. 2002-122780 is consist of one lens, which would make it hard to achieve a high optical performance.

An object of the present invention is to provide an observation optical system which enables observation of image information displayed on an image display plane at a wide viewing angle and with a high optical performance while reducing a size and a weight of the entire system, and to provide an observation apparatus including this observation optical system.

SUMMARY OF THE INVENTION

An observation optical system according to the present invention includes a Fresnel lens and a lens LP with a positive refractive power provided on a light incident side or a light emitting side of the Fresnel lens, in which a following conditional expression is satisfied:

$$0.01 < h1/h0 < 0.80,$$

where h0 represents a length in a direction of an optical axis from a surface vertex of a central annular section of the Fresnel lens to an end portion of the central annular section, and h1 represents a length in the direction of the optical axis of a grating wall surface of a first annular section adjacent to the central annular section.

Further features of the present invention will become apparent from the following description of exemplary embodiments with reference to the attached drawings.

BRIEF DESCRIPTION OF THE DRAWINGS

FIG. 3 is a lens cross-sectional view of an observation apparatus including an observation optical system according to an Example 2 of the present invention.

FIG. 4A illustrates longitudinal aberration diagrams of the observation optical system of the Example 2 of the present invention at an eye relief of 10 mm.

FIG. 4B illustrates longitudinal aberration diagrams of the observation optical system of the Example 2 of the present invention at an eye relief of 20 mm.

FIG. 5 is a lens cross-sectional view of an observation apparatus including an observation optical system according to an Example 3 of the present invention.

FIG. 6A illustrates longitudinal aberration diagrams of the observation optical system of the Example 3 of the present invention at an eye relief of 10 mm.

FIG. 6B illustrates longitudinal aberration diagrams of the observation optical system of the Example 3 of the present invention at an eye relief of 20 mm.

FIG. 8A illustrates longitudinal aberration diagrams of the observation optical system of the Example 4 of the present invention at an eye relief of 10 mm.

FIG. 8B illustrates longitudinal aberration diagrams of the observation optical system of the Example 4 of the present invention at an eye relief of 20 mm.

FIG. 9 is a lens cross-sectional view of an observation apparatus including an observation optical system according to an Example 5 of the present invention.

FIG. 10A illustrates longitudinal aberration diagrams of the observation optical system of the Example 5 of the present invention at an eye relief of 10 mm.

FIG. 10B illustrates longitudinal aberration diagrams of the observation optical system of the Example 5 of the present invention at an eye relief of 20 mm.

DESCRIPTION OF THE EMBODIMENTS

Preferred examples of the present invention will be described below with reference to the accompanying drawings. An optical system of each example is an observation optical system for observing an image displayed on an image display plane, and the optical system includes a Fresnel lens LF and a lens having a positive refractive power (a positive lens) LP.

In this specification, the Fresnel lens represents an optical element that includes Fresnel gratings. A surface shape of each of an optical surface on a light incident side and an optical surface on a light emitting side (or an envelope surface obtained by connecting vertices of the Fresnel gratings when the optical surface includes the Fresnel gratings) of the Fresnel lens may be a flat surface or a curved surface. When the Fresnel lens has a curved optical surface, the curved optical surface may be not only of a spherical shape but also of a free-form curved shape.

Figure 1:
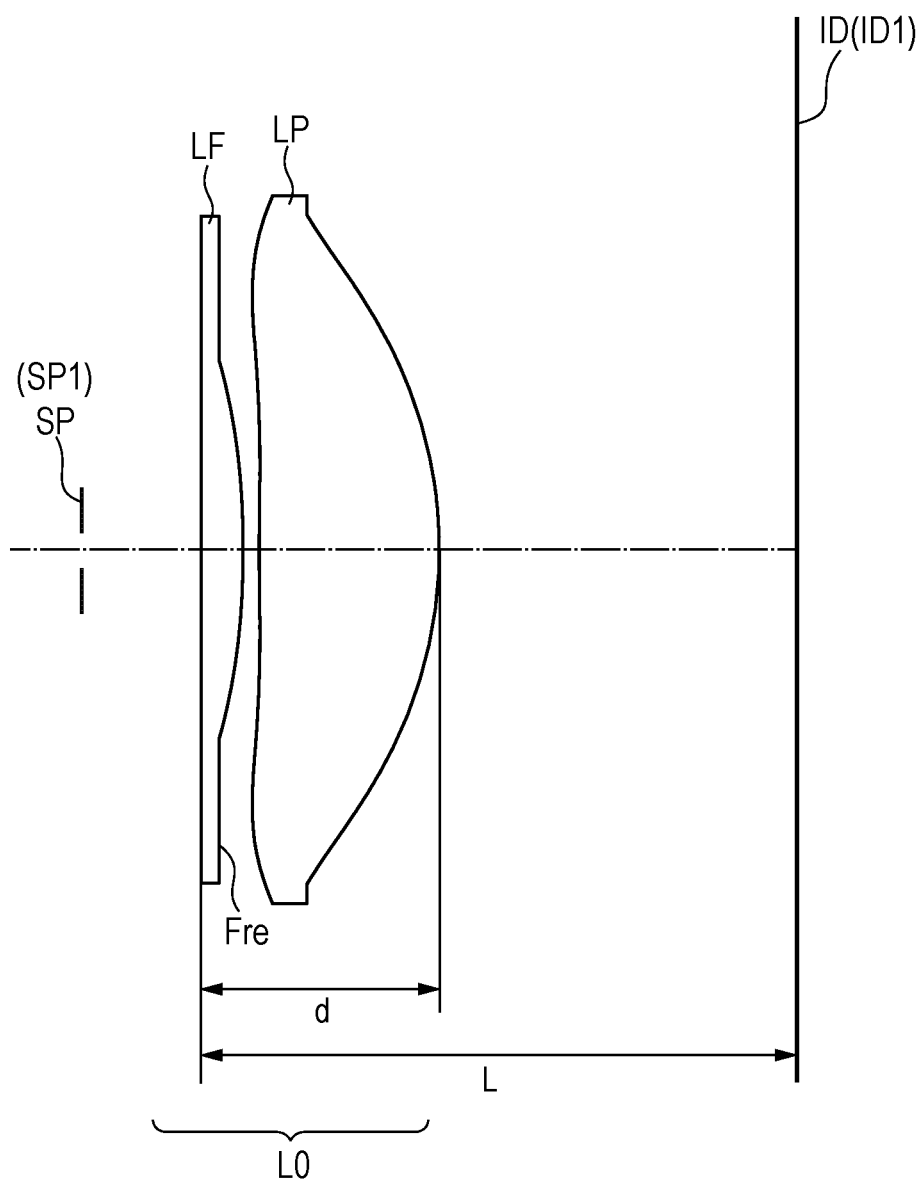
FIG. 1 is a lens cross-sectional view of an observation apparatus including an observation optical system according to an Example 1 of the present invention.
Figure 2A:
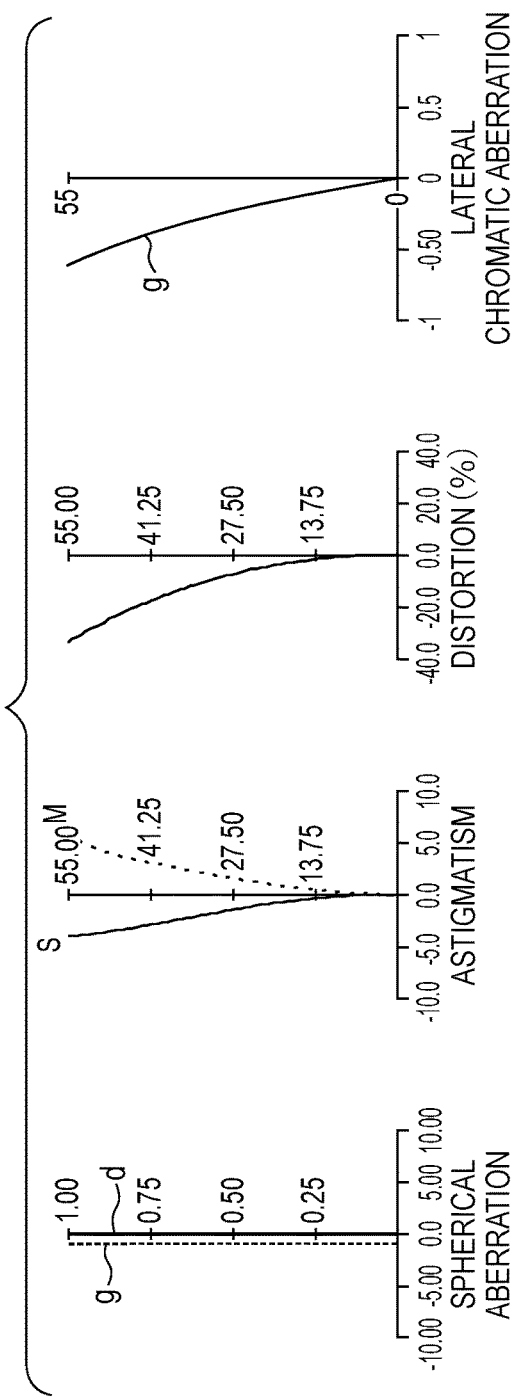
FIG. 2A illustrates longitudinal aberration diagrams of the observation optical system of the Example 1 of the present invention at an eye relief of 10 mm.
Figure 2B:
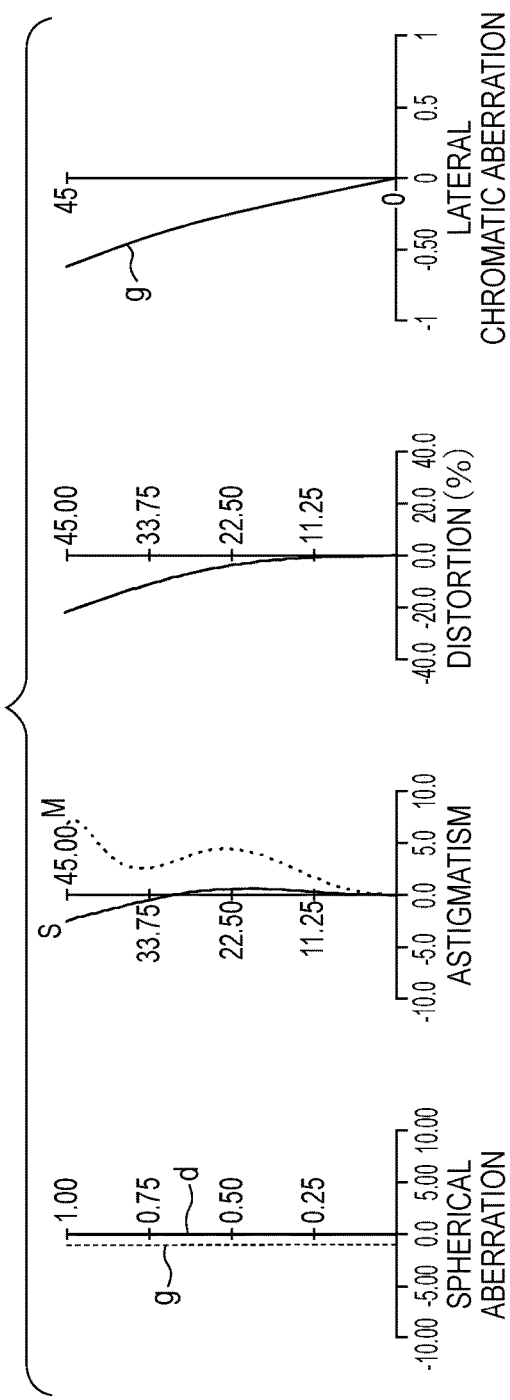
FIG. 2B illustrates longitudinal aberration diagrams of the observation optical system of the Example 1 of the present invention at an eye relief of 20 mm.

FIG. 1 is a lens cross-sectional view of an observation apparatus including an observation optical system according to an Example 1 of the present invention. FIGS. 2A and 2B illustrate longitudinal aberration diagrams of the observation optical system of the Example 1 of the present invention at an eye relief of 10 mm and at an eye relief of 20 mm, respectively. FIG. 3 is a lens cross-sectional view of an observation apparatus including an observation optical system according to an Example 2 of the present invention. FIGS. 4A and 4B illustrate longitudinal aberration diagrams of the observation optical system of the Example 2 of the present invention at an eye relief of 10 mm and at an eye relief of 20 mm, respectively.

Figure 7:
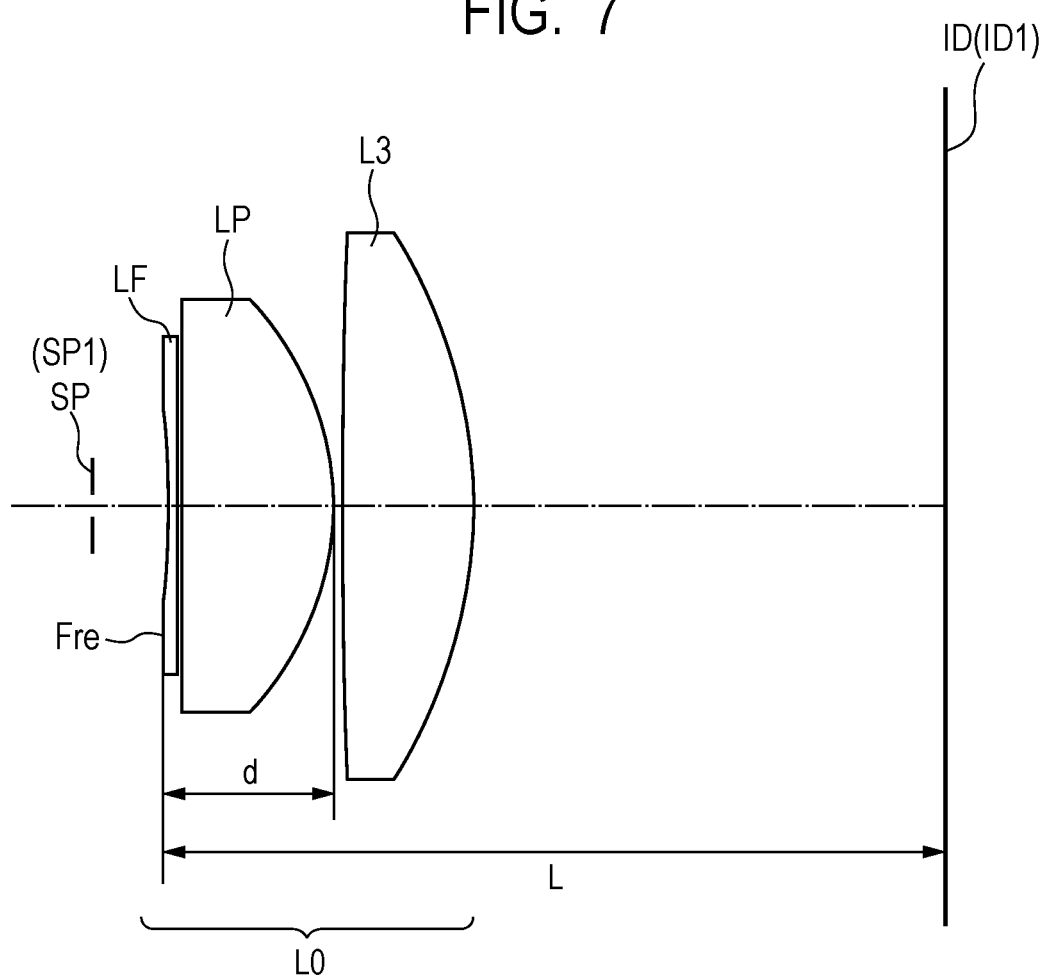
FIG. 7 is a lens cross-sectional view of an observation apparatus including an observation optical system according to an Example 4 of the present invention.

FIG. 5 is a lens cross-sectional view of an observation apparatus including an observation optical system according to an Example 3 of the present invention. FIGS. 6A and 6B illustrate longitudinal aberration diagrams of the observation optical system of the Example 3 of the present invention at an eye relief of 10 mm and at an eye relief of 20 mm, respectively. FIG. 7 is a lens cross-sectional view of an observation apparatus including an observation optical system according to an Example 4 of the present invention. FIGS. 8A and 8B illustrate longitudinal aberration diagrams of the observation optical system of the Example 4 of the present invention at an eye relief of 10 mm and at an eye relief of 20 mm, respectively.

Figure 11A:
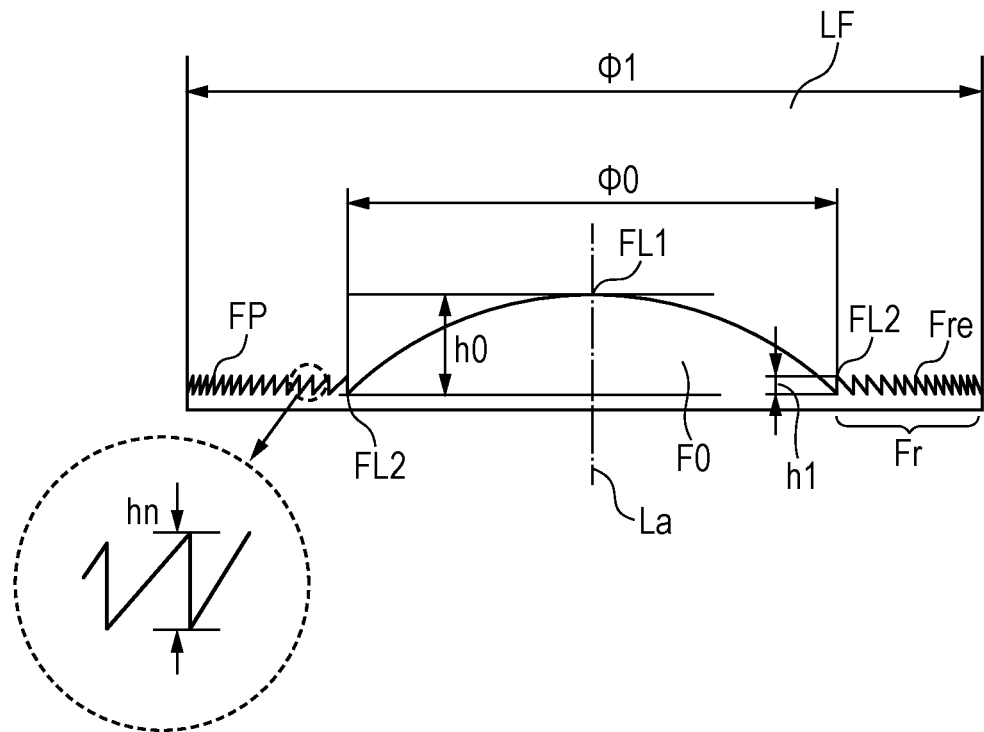
FIG. 11A is an explanatory diagram of definitions in the observation optical system of the present invention, which include a length in a direction of an optical axis from a surface vertex of a central annular section to an end portion of a Fresnel lens, a length of a wall surface of a Fresnel grating, a diameter from the surface vertex of the central annular section of the Fresnel lens to the end portion thereof, an effective diameter of the Fresnel lens, and so forth.
Figure 11B:
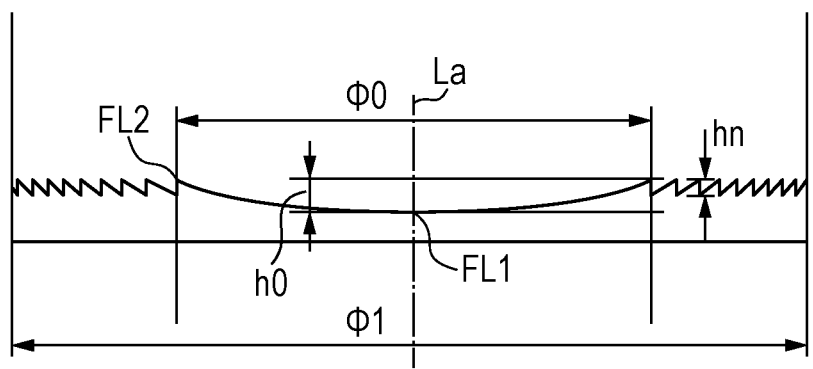
FIG. 11B is another explanatory diagram of definitions in the observation optical system of the present invention, which include a length in the direction of the optical axis from a surface vertex of a central annular section to an end portion of a Fresnel lens, a length of a wall surface of a Fresnel grating, a diameter from the surface vertex of the central annular section of the Fresnel lens to the end portion thereof, an effective diameter of the Fresnel lens, and so forth.
Figure 12A:
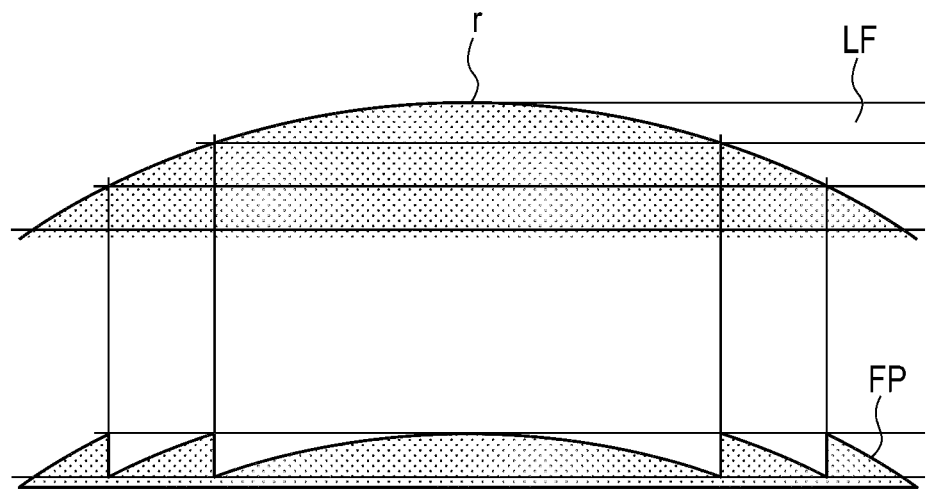
FIG. 12A is an explanatory diagram of a Fresnel lens.
Figure 12B:
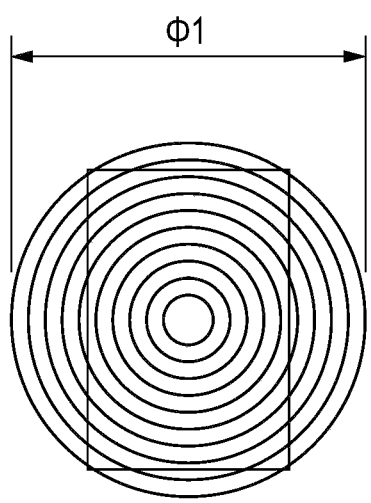
FIG. 12B is another explanatory diagram of the Fresnel lens.
Figure 12C:
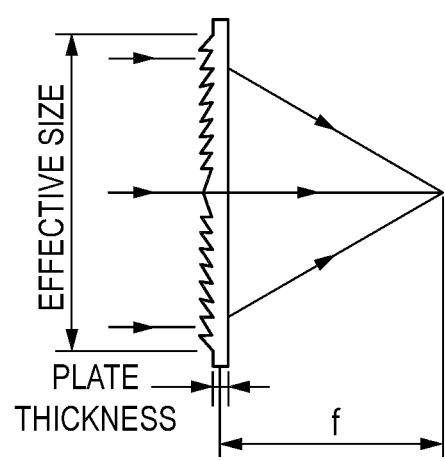
FIG. 12C is still another explanatory diagram of the Fresnel lens.

FIG. 9 is a lens cross-sectional view of an observation apparatus including an observation optical system according to an Example 5 of the present invention. FIGS. 10A and 10B illustrate longitudinal aberration diagrams of the observation optical system of the Example 5 of the present invention at an eye relief of 10 mm and at an eye relief of 20 mm, respectively. FIGS. 11A and 11B are explanatory diagrams to explain definitions of a length in a direction of an optical axis from a surface vertex of a central annular section of a Fresnel lens to an end portion of the central annular section thereof, and a length in the direction of the optical axis of a grating wall surface in this specification, respectively. FIGS. 12A, 12B, and 12C are explanatory diagrams of a Fresnel lens, respectively.

In the lens cross-sectional views, reference sign L0 denotes the observation optical system which includes the lens having a positive refractive power (the positive lens) LP and the Fresnel lens LF. Reference sign Fre denotes a Fresnel surface of the Fresnel lens LF. When the observation optical system L0 includes a plurality of positive lenses, the positive lens LP is the positive lens that has the largest refractive power among them. Here, the positive lens LP is a lens in which a lens surface is a curved surface having a curvature and the curved surface has a refraction effect. The Fresnel lens is excluded from the positive lens in this regard. Reference sign ID denotes an image display plane on which a liquid crystal display element ID1 is located, for example. Reference sign SP denotes an observation plane on which the pupil of an observer is located. Here, a stop (SP1) may be located on the observation plane SP instead.

In the lens cross-sectional view of each of the examples, the eye relief represents an interval between an eye point and a lens surface located closest to the observation plane SP on the optical axis. Starting from the left, each set of the aberration diagrams represent spherical aberration, astigmatism, distortion, and lateral chromatic aberration, respectively. Each spherical aberration diagram depicts spherical aberrations regarding the d-line (a wavelength of 587.6 nm) and the g-line (a wavelength of 435.8 nm). In each astigmatism diagram, a line S and a line M depict astigmatisms on the sagittal image plane and the meridional image plane, respectively. Each distortion diagram depicts a distortion regarding the d-line. Each chromatic aberration diagram depicts a chromatic aberration regarding the g-line.

Regarding evaluations of the aberrations, an aberration on the observation plane SP side of a beam emitted from the image display plane ID corresponds one-to-one to an aberration on the image display plane ID of a beam emitted from the observation plane SP side. For this reason, the aberrations on the image display plane ID are evaluated for convenience sake. Meanwhile, an aperture stop diameter of the stop SP1 in each example is set to 3.5 mm as an example of a diameter of the pupil of a human eye. In the meantime, fluctuations of the aberrations attributed to the eye relief are suppressed in order to deal with a variation in eye relief among observers and to deal with a situation where an observer puts glasses on. To this end, the aberration diagrams representatively illustrate the aberrations at the eye relief of 10 mm and at the eye relief of 20 mm.

FIGS. 11A and 11B are the explanatory diagrams to define respective factors of the Fresnel lens LF according to the present invention. Reference sign Fre denotes the Fresnel surface on which a plurality of Fresnel gratings FP of concentric shapes are arranged at a predetermined grating pitch. Reference sign F0 denotes a central annular section which is a continuous surface formed from a spherical surface, an aspherical surface, or the like. Reference sign La denotes an optical axis. Reference sign $\phi 1$ denotes an effective diameter of the Fresnel lens LF. Reference sign $\phi 0$ denotes an effective diameter of the central annular section F0 of the Fresnel lens LF, or more specifically, a diameter from one end portion FL2 to another end portion FL2 of the central annular section F0. Reference sign Fr denotes a Fresnel annular section provided with the Fresnel grating.

In FIGS. 11A and 11B, a length in the direction of the optical axis La from a surface vertex FL1 to the end portion FL2 of the central annular section F0 of the Fresnel lens LF is represented by h0, and a length of a wall surface of an n-th Fresnel grating (annular section) counted from the optical axis La side is represented by hn.

Next, a configuration of the observation optical system L0 of the present invention will be described. The observation optical system L0 of the present invention includes the positive lens LP and the Fresnel lens LF. The observation optical system L0 is consists of a plurality of lenses. Accordingly, when the Fresnel lens LF has a positive refractive power, it is possible to relax the curvatures of respective surfaces, thereby reducing an amount of occurrence of aberration on each surface and reducing an amount of aberration as a whole. On the other hand, when the Fresnel lens LF has a negative refractive power, it is possible to reduce a Petsval sum as a whole and thus to reduce a field curvature. This configuration also reduces a lateral chromatic aberration.

The length in the direction of the optical axis from the surface vertex FL1 of the central annular section F0 to the end portion FL2 of the central annular section F0 of the Fresnel lens LF is defined as the length h0. A length in the direction of the optical axis of a grating wall surface of a first annular section counted from the center of the optical axis of the Fresnel annular sections Fr of the Fresnel lens LF (a length in the direction of the optical axis of the grating wall surface of the first annular section adjacent to the central annular section F0) is defined as the length h1. Here, the following conditional expression (1) is satisfied:

$$0.01 < h1/h0 < 0.80 \qquad (1).$$

The conditional expression (1) defines a ratio between the length h1 in the direction of the optical axis of the grating wall surface of the first annular section of the Fresnel annular sections Fr of the Fresnel lens LF and the length h0 in the direction of the optical axis from the surface vertex FL1 to the end portion FL2 of the central annular section F0 of the Fresnel lens LF. The length in the direction of the optical axis from the surface vertex FL1 to the end portion FL2 of the central annular section F0 of the Fresnel lens LF is set larger than the length in the direction of the optical axis of the grating wall surface of the first annular section of the Fresnel lens LF.

In this way, a proportion of the region (the central annular section) F0 having the continuous profile in a radial direction of the Fresnel lens LF is increased so as to reduce image quality deterioration factors attributable to the serrated shape of the Fresnel lens LF in a central region of a display that is apt to draw attention of an observer, and thus to improve an optical performance.

If this ratio falls below the lower limit of the conditional expression (1), the length in the direction of the optical axis from the surface vertex FL1 to the end portion FL2 of the central annular section F0 becomes too large and the weight is therefore increased. From another perspective, the length in the direction of the optical axis of the grating wall surface of the first annular section of the Fresnel lens LF becomes too small whereby flare attributable to diffraction is increased and the optical performance starts to decline.

On the other hand, if the ratio exceeds the upper limit of the conditional expression (1), the length in the direction of the optical axis from the surface vertex FL1 to the end portion FL2 of the central annular section F0 becomes too small when the Fresnel lens LF has a strong refractive power. As a consequence, a serrated shape of the Fresnel lens LF is reproduced in the central region of the display that is apt to draw attention of the observer and the optical performance starts to decline. When the Fresnel lens LF has a weak refractive power, a refractive power of the other lens in the configuration becomes too strong whereby off-axis aberrations are increased. On the other hand, the length in the direction of the optical axis of the grating wall surface of the first annular section of the Fresnel lens LF becomes too large whereby unnecessary light (a ghost) reflected from the wall surface is increased and the optical performance starts to decline.

It is preferable to set the range of the numerical values in the conditional expression (1) as follows:

$$0.02 < h1/h0 < 0.65 \qquad (1a).$$

It is more preferable to set the range of the numerical values in the conditional expression (1a) as follows:

$$0.03 < h1/h0 < 0.50 \qquad (1b).$$

The above-described configuration brings about the observation optical system that has a high optical performance and a light weight as a whole while achieving a wide viewing angle.

Here, the observation optical system L0 may satisfy the following conditional expression (2) instead of the conditional expression (1) discussed above. Satisfaction of the conditional expression (2) also makes it possible to obtain the observation optical system that has a high optical performance and a light weight as a whole while achieving a wide viewing angle:

$$0.3 < \phi 0/\phi 1 < 0.7 \qquad (2).$$

In the conditional expression (2), reference sign $\phi 0$ denotes the diameter of the central annular section F0 of the Fresnel lens LF and reference sign $\phi 1$ denotes the effective diameter of the Fresnel lens LF.

The conditional expression (2) defines a ratio between the effective diameter (the diameter) $\phi 0$ of the central annular section F0 of the Fresnel lens LF and the effective diameter $\phi 1$ of the Fresnel lens LF. If this ratio falls below the lower limit of the conditional expression (2), the serrated shape of the Fresnel lens LF is formed in the central region of the display that is apt to draw attention of the observer and the optical performance starts to decline. On the other hand, if the ratio exceeds the upper limit of the conditional expression (2), the region forming the continuous profile (the lens surface) becomes too large whereby the weight of the entire system is increased.

It is preferable to set the range of the numerical values in the conditional expression (2) as follows:

$$0.32 < \phi 0/\phi 1 < 0.65 \qquad (2a).$$

It is more preferable to set the range of the numerical values in the conditional expression (2a) as follows:

$$0.34 < \phi 0/\phi 1 < 0.62 \qquad (2b).$$

Note that the observation optical system L0 may satisfy both of the conditional expression (1) and the conditional expression (2).

Moreover, it is desirable that one or more of the following conditional expressions be satisfied. Here, reference sign fh is defined as a focal length of the Fresnel lens LF and reference sign F is defined as a focal length of the observation optical system L0. When the observation optical system L0 includes one or more lenses having a positive refractive power, the lens having the largest refractive power is defined as the positive lens LP and a focal length of the positive lens LP is defined as a reference sign fp. Of the positive lens LP and the Fresnel lens LF, a length on the optical axis from a lens surface on the observation plane side of the lens located closest to the observation plane side to a lens surface on the image display plane side of the lens located closest to the image display plane side is defined as a reference sign d.

Meanwhile, a length on the optical axis from the lens surface on the observation plane side of the lens located closest to the observation plane side in the observation optical system L0 to the image display plane is defined as a reference sign L. Reference sign Rp11 denotes a curvature radius of the surface on the observation plane side of the Fresnel lens LF and reference sign Rp12 denotes a curvature radius of the surface on the image display plane side of the Fresnel lens LF when the Fresnel lens LF has a positive refractive power. Reference sign Rn11 denotes the curvature radius of the surface on the observation plane side of the Fresnel lens LF and reference sign Rn12 denotes the curvature radius of the surface on the image display plane side of the Fresnel lens LF when the Fresnel lens LF has a negative refractive power. Reference sign R21 denotes a curvature radius of the lens surface on the observation plane side of the positive lens LP and reference sign R22 denotes a curvature radius of the surface on the image display plane side of the positive lens LP.

Meanwhile, an average value of lengths in the direction of the optical axis of the grating wall surfaces within an effective surface of the Fresnel lens LF is defined as a reference sign have (mm) and a length of a wavelength of the d-line is defined as a reference sign $\lambda$, (mm). Reference sign w1 denotes a grating pitch of the first annular section of the Fresnel lens LF and reference sign we denotes a grating pitch of the outermost annular section within the effective surface of the Fresnel lens LF.

Figure 13:
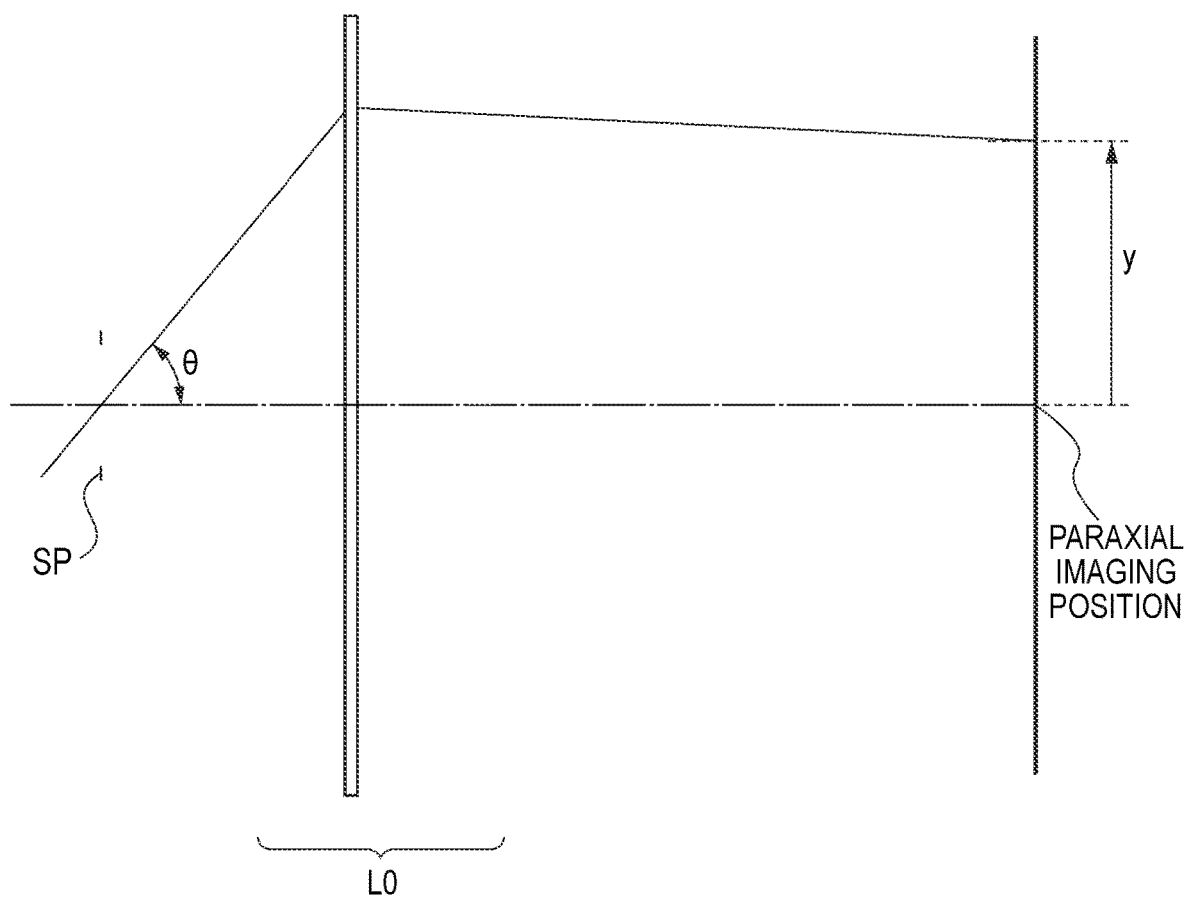
FIG. 13 is an explanatory diagram of an image height at a half viewing angle of 45°.

In the meantime, reference sign y0 denotes an ideal image height of the image display plane at an eye relief of 10 mm and at a half viewing angle of 45° while reference sign y denotes an actual image height of the image display plane at the eye relief of 10 mm and at the half viewing angle of 45°. Here, the ideal image height y0 at the eye relief of 10 mm and at the half viewing angle of 45° is a value given by y0=F×tan 45°. Meanwhile, the "actual image height y" represents a height in a direction perpendicular to the optical axis at a paraxial imaging position of a principal ray incident on the observation optical system L0 at the eye relief of 10 mm and at the half viewing angle of 45°. FIG. 13 is a diagram for explaining the height y in the observation optical system L0. FIG. 13 illustrates that the principal ray at the viewing angle $\theta$ (=45°) incident from the stop SP to the observation optical system L0 reaches a position at the height y on the paraxial imaging position of the observation optical system L0:

$$1.5 < |fh|/F < 5.0 \qquad (3),$$

$$1.2 < fp/F < 2.0 \qquad (4),$$

$$0.1 < d/L < 0.4 \qquad (5),$$

$$-1.6 < (Rp12+Rp11)/(Rp12-Rp11) < -0.5 \qquad (6),$$

$$0.8 < (Rn12+Rn11)/(Rn12-Rn11) < 1.7 \qquad (7),$$

$$-1.6 < (R22+R21)/(R22-R21) < -0.4 \qquad (8),$$

$$50.0 < \text{have}/\lambda < 500.0 \qquad (9),$$

$$1.2 < w1/we < 10.0 \qquad (10),$$

$$-0.35 < (y-y0)/y0 < -0.10 \qquad (11), \text{ and}$$

$$0.5 < y/F < 1.1 \qquad (12).$$

Next, a description will be given of technical meaning of each of the conditional expressions described above. The conditional expression (3) defines a ratio between the focal length of the Fresnel lens LF and the focal length of the observation optical system L0. If this ratio falls below the lower limit of the conditional expression (3) and the refractive power of the Fresnel lens LF becomes too strong (the absolute value of the refractive power becomes too large), the grating pitches of the respective Fresnel gratings constituting the serrated shape become too small. As a consequence, a diffraction angle of diffracted light becomes too large whereby the flare is increased. On the other hand, if the ratio exceeds the upper limit of conditional expression (3), the refractive powers of the respective lenses become too strong when there are not many other lenses constituting the observation optical system L0, whereby the off-axis aberrations are increased. When there are many other lenses constituting the system, the weight of the entire system is increased.

The conditional expression (4) defines a ratio between the focal length of the positive lens LP and the focal length of the observation optical system L0. If this ratio falls below the lower limit of the conditional expression (4), the refractive power of the positive lens LP becomes too strong whereby the field curvature and the astigmatism are mainly increased. On the other hand, if the ratio exceeds the upper limit of conditional expression (4), the refractive powers of the respective lenses become too strong when there are not many other lenses constituting the system whereby the off-axis aberrations are increased. When there are many other lenses constituting the system, the weight of the entire system is increased.

When the reference sign d represents the length on the optical axis from the lens surface on the observation plane SP side of the lens located closest to the observation plane side to the lens surface on the image display plane ID side of the lens located closest to the image display plane side out of the positive lens LP and the Fresnel lens LF, the conditional expression (5) defines a ratio of the length from the lens surface on the observation plane SP side of the lens located closest to the observation plane side to the image display plane ID relative to the length d.

If this ratio falls below the lower limit of the conditional expression (5), it is difficult to hold the lenses by using a mechanism because intervals between the lenses become too small. From another perspective, thicknesses of the lenses become too small whereby the lenses are prone to deformation and the optical performance is prone to decline. On the other hand, if the ratio exceeds the upper limit of the conditional expression (5), the intervals between the lenses become too large whereby the effective diameter of the lens located on the image display plane side becomes large and the weight is increased. From another perspective, the thicknesses of the lenses become too large whereby the weight is increased.

The conditional expression (6) defines a form factor of the Fresnel lens LF when the Fresnel lens LF has a positive refractive power. If this form factor falls below the lower limit of the conditional expression (6), the curvature of the surface on the image display plane side of the Fresnel lens LF becomes too strong whereby the field curvature and the astigmatism are mainly increased. On the other hand, if the form factor exceeds the upper limit of the conditional expression (6), the curvature of the surface on the observation plane side of the Fresnel lens LF becomes too strong whereby the distortion is mainly increased.

The conditional expression (7) defines a form factor of the Fresnel lens LF when the Fresnel lens LF has a negative refractive power. If this form factor falls below the lower limit of the conditional expression (7), the curvature of the surface on the image display plane side of the Fresnel lens LF becomes too strong whereby the field curvature and the astigmatism are mainly increased. On the other hand, if the form factor exceeds the upper limit of the conditional expression (7), the curvature of the surface on the observation plane side of the Fresnel lens LF becomes too strong whereby the field curvature and the astigmatism are mainly increased.

The conditional expression (8) defines a form factor of the positive lens LP. If this form factor falls below the lower limit of the conditional expression (8), the curvature of the surface on the image display plane side of the positive lens LP becomes too strong whereby the field curvature and the astigmatism are mainly increased. On the other hand, if the form factor exceeds the upper limit of the conditional expression (8), the curvature of the surface on the observation plane side of the positive lens LP becomes too strong whereby the distortion is mainly increased.

The conditional expression (9) defines a ratio between the average value of the lengths of the wall surfaces of the Fresnel gratings within the effective diameter of the Fresnel lens LF and the length of the wavelength of the d-line. If this ratio falls below the lower limit of the conditional expression (9), the lengths of the wall surfaces of the Fresnel gratings within the effective diameter of the Fresnel lens LF become too small whereby an intensity of the diffracted light is increased and the optical performance starts to decline. On the other hand, if the ratio exceeds the upper limit of the conditional expression (9), the lengths of the wall surfaces of the Fresnel gratings of the Fresnel lens LF become too large whereby the unnecessary light (a ghost) reflected from the wall surfaces is increased and the optical performance starts to decline.

The conditional expression (10) defines a ratio between the grating pitch of the Fresnel grating in the first annular section of the Fresnel lens LF and the grating pitch of the Fresnel grating in the outermost annular section within the effective beam diameter $\phi 1$ of the Fresnel lens LF. If this ratio falls below the lower limit of the conditional expression (10), the grating pitch of the Fresnel grating in the first annular section becomes too small. As a consequence, the diffraction angle of the diffracted light becomes too large and the flare affects the central region of the display whereby the optical performance starts to decline.

On the other hand, if the ratio exceeds the upper limit of the conditional expression (10), the grating pitch of the Fresnel grating in the outermost annular section within the effective beam diameter $\phi 1$ becomes too small. As a consequence, the diffraction angle of the diffracted light becomes too large and the flare affects the central region of the display whereby the optical performance starts to decline.

The conditional expression (11) defines an amount of distortion on the image display plane ID at the eye relief of 10 mm and at the half viewing angle of 45°. If this amount of distortion falls below the lower limit of the conditional expression (11), the positive refractive force is too strong. Accordingly, the beam around the display is strongly bent in the direction of the optical axis whereby the off-axis aberrations are increased. On the other hand, if the amount of distortion exceeds the upper limit of the conditional expression (11), the positive refractive power is too small. Accordingly, an incident height of the beam around the display at each lens position becomes too large and the effective diameter is increased. As a consequence, the weight of the entire system is increased.

The conditional expression (12) defines a ratio between the actual image height (the height in the direction perpendicular to the optical axis at the paraxial imaging position) y of the principal ray at the half viewing angle of 45° in the observation optical system L0 and the focal length F of the observation optical system L0 at the eye relief of 10 mm. This ratio represents a refractive power of a peripheral portion of the observation optical system L0 corresponding to a viewing angle of 45°. The image height y becomes smaller as the refractive power of the peripheral portion is stronger. Accordingly, the satisfaction of the conditional expression (12) makes it possible to achieve the wider viewing angle while forming the image display element small in size. If this ratio falls below the lower limit of the conditional expression (12) and the focal length F of the observation optical system L0 becomes too large, a total length of the observation optical system L0 is increased whereby the system is increased in size. From another perspective, the refractive power of the peripheral portion of the observation optical system becomes too strong whereby the astigmatism and the field curvature are increased in particular.

On the other hand, if the ratio exceeds the upper limit of the conditional expression (12) and the height y becomes too large, the image display plane becomes too large whereby the image display element is increased in size.

The above-described configuration makes it possible to obtain the observation optical system with the high optical performance and the light weight of the entire system while achieving the wide viewing angle.

It is preferable to set the ranges of the numerical values in the conditional expressions (3) to (12) as follows:

$$1.6<|fh|/F<4.8 \quad (3a),$$

$$1.23<fp/F<1.95 \quad (4a),$$

$$0.12<d/L<0.35 \quad (5a),$$

$$-1.5<(Rp12+Rp11)/(Rp12-Rp11)<-0.6 \quad (6a),$$

$$0.9<(Rn12+Rn11)/(Rnl2-Rn11)<1.6 \quad (7a),$$

$$-1.5<(R22+R21)/(R22-R21)<-0.5 \quad (8a),$$

$$75.0<\text{have}/\lambda<400.0 \quad (9a),$$

$$1.4<w1/we<8.0 \quad (10a),$$

$$-0.34<(y-y0)/y0<-0.15 \quad (11a), \text{ and}$$

$$0.6<y/F<1.0 \quad (12a).$$

It is more preferable to set the ranges of the numerical values in the conditional expressions (3a) to (12a) as follows:

$$1.7<|fh|/F<4.6 \quad (3b),$$

$$1.25<fp/F<1.90 \quad (4b),$$

$$0.14<d/L<0.33 \quad (5b),$$

$$-1.4<(Rp12+Rp11)/(Rp12-Rp11)<-0.7 \quad (6b),$$

$$0.95<(Rn12+Rn11)/(Rn12-Rn11)<1.55 \quad (7b),$$

$$-1.4<(R22+R21)/(R22-R21)<-0.6 \quad (8b),$$

$$100.0<\text{have}/\lambda<300.0 \quad (9b),$$

$$1.6<w1/we<7.0 \quad (10b),$$

$$-0.33<(y-y0)/y0<-0.19 \quad (11b), \text{ and}$$

$$0.7<y/F<0.9 \quad (12b).$$

Next, a description will be given of the observation optical systems L0 of the respective Examples.

Example 1

The observation optical system L0 according to the Example 1 of the present invention will be described below with reference to FIG. 1. The observation optical system L0 of the Example 1 includes a Fresnel lens LF having a positive refractive power and a lens (a positive lens) LP having a positive refractive power, which are arranged in this order from an observation plane side to an image display plane side. The two lenses share the positive refractive powers to relax curvatures of respective surfaces, thereby reducing the occurrence of the aberrations. The surface on the image display plane ID side of the Fresnel lens LF having the positive refractive power is formed into the Fresnel surface.

Meanwhile, the length h0 in the direction of the optical axis from the surface vertex FL1 to the end portion FL2 of the central annular section of the Fresnel lens LF is increased within an appropriate range satisfying the conditional expression (1). In this way, the proportion of the region having the continuous profile in the radial direction of the Fresnel lens LF is increased so as to improve the optical performance in the range of the display that is apt to draw attention of the observer.

Moreover, the region of the continuous profile is set within an appropriate range satisfying the conditional expression (2) so as to improve the optical performance and to reduce the weight. Furthermore, the focal length of the Fresnel lens LF is relaxed within an appropriate range satisfying the conditional expression (3) so as to prevent the grating pitches of the Fresnel gratings from becoming too small, thereby reducing the flare attributable to the diffraction. In addition, the focal length of the positive lens LP is relaxed within an appropriate range satisfying the conditional expression (4) so as to mainly suppress the occurrence of the field curvature and the astigmatism. Further, the thickness of each of the Fresnel lens LF and the positive lens LP is reduced within an appropriate range satisfying the conditional expression (5) so as to reduce the weight of the entire system.

Moreover, the curvature of the surface on the image display plane side of the Fresnel lens LF is increased more than the curvature of the surface on the observation plane SP side thereof in such a way as to satisfy the conditional expression (6), and the convex shape of the Fresnel lens LF is oriented to the image display plane side. Thus, the Fresnel lens LF is formed into the concentric shape with the observation plane SP. In this way, an incident angle of an off-axis ray is relaxed so as to reduce the occurrence of the off-axis aberrations.

Furthermore, the curvature of the surface on the image display plane ID side of the positive lens LP is increased more than the curvature of the surface on the observation plane SP side thereof in such a way as to satisfy the conditional expression (8), and the convex shape of the positive lens LP is oriented to the image display plane ID. Thus, the positive lens LP is formed into the concentric shape with the observation plane SP. In this way, the incident angle of the off-axis ray is relaxed so as to reduce the occurrence of the off-axis aberrations.

Moreover, the average value of the lengths of the wall surfaces of the Fresnel gratings within the effective diameter of the Fresnel lens LF is increased within an appropriate range satisfying the conditional expression (9) so as to prevent the occurrence of the diffracted light being the unnecessary light and to improve the optical performance. Furthermore, the grating pitch of the Fresnel grating in the first annular section of the Fresnel lens LF and the grating pitch of the Fresnel grating in the outermost annular section within the effective beam diameter ϕ1 of the Fresnel lens LF are set to satisfy the conditional expression (10) so as to prevent the occurrence of the diffracted light on the display as a whole and to improve the optical performance.

Moreover, by setting the amount of distortion appropriately so as to satisfy the conditional expression (11), the beam around the display is prevented from being bent strongly in the direction of the optical axis, thus achieving the improvement in the optical performance.

Furthermore, by setting the refractive powers appropriately so as to satisfy the conditional expression (12), the image display element is reduced in size and the wider viewing angle in the observation optical system L0 is achieved.

Example 2

The observation optical system L0 according to the Example 2 of the present invention will be described below with reference to FIG. 3. The observation optical system L0 of the Example 2 includes a lens (a positive lens) LP having a positive refractive power, a lens (a negative lens) L3 having a negative refractive power, and a Fresnel lens LF having a positive refractive power, which are arranged in this order from the observation plane side to the image display plane side. The two lenses share the positive refractive powers to relax curvatures of respective surfaces, thereby reducing the occurrence of the aberrations.

Meanwhile, the lateral chromatic aberration and the field curvature are reduced by providing the negative lens L3. Moreover, the reduction in weight of the entire system is achieved by locating the Fresnel lens LF having the positive refractive power closest to the image display plane side among the aforementioned three lenses, or in other words, at such a position to increase the effective diameter. Other configurations of the Example 2 are the same as those of the Example 1.

Example 3

The observation optical system L0 according to the Example 3 of the present invention will be described below with reference to FIG. 5. The observation optical system L0 of the Example 3 includes a parallel flat plate (an optical member) Lt, a lens (a positive lens) LP having a positive refractive power, and a Fresnel lens LF having a positive refractive power, which are arranged in this order from the observation plane side to the image display plane side. If the positive lens LP is in a bare state (exposed to outside), the positive lens LP may develop a deformation or cracks if oil and the like come into contact. The flat plate lens Lt has a role for protecting the positive lens LP.

Moreover, the reduction in weight of the entire system is achieved by locating the Fresnel lens LF having the positive refractive power closest to the image display plane side among the aforementioned three lenses, or in other words, at such a position to increase the effective diameter. Other configurations of the Example 3 are the same as those of the Example 1.

Example 4

The observation optical system L0 according to the Example 4 of the present invention will be described below with reference to FIG. 7. The observation optical system L0 of the Example 4 includes a Fresnel lens LF having a negative refractive power, a lens (a positive lens) LP having a positive refractive power, and a lens L3 having a positive refractive power, which are arranged in this order from the observation plane side to the image display plane side. The two lenses share the positive refractive powers to relax curvatures of respective surfaces, thereby reducing the occurrence of the aberrations. Moreover, the lateral chromatic aberration and the field curvature are reduced by providing the Fresnel lens LF having the negative refractive power.

The curvature of the surface on the observation plane side of the Fresnel lens LF is increased more than the curvature of the surface on the image display plane side thereof in such a way as to satisfy the conditional expression (7), and the concave shape of the Fresnel lens LF is oriented to the observation plane SP. Thus, the Fresnel lens LF is formed into the concentric shape with the observation plane SP. In this way, the incident angle of the off-axis ray is relaxed so as to reduce the occurrence of the off-axis aberrations. Other configurations of the Example 4 are the same as those of the Example 1.

Example 5

The observation optical system L0 according to the Example 5 of the present invention will be described below with reference to FIG. 9. The observation optical system L0 of the Example 5 includes a lens (a positive lens) LP having a positive refractive power, a Fresnel lens LF having a negative refractive power, a lens (a positive lens) L3 having a positive refractive power, and a lens (a positive lens) L4 having a positive refractive power, which are arranged in this order from the observation plane side to the image display plane side. The three lenses share the positive refractive powers to further relax curvatures of respective surfaces, thereby reducing the occurrence of the aberrations. Moreover, the lateral chromatic aberration and the field curvature are reduced by providing the Fresnel lens LF having the negative refractive power.

The curvature of the surface on the observation plane side of the Fresnel lens LF is increased more than the curvature of the surface on the image display plane side thereof in such a way as to satisfy the conditional expression (7), and the concave shape of the Fresnel lens LF is oriented to the observation plane SP. Thus, the Fresnel lens LF is formed into the concentric shape with the observation plane SP. In this way, the incident angle of the off-axis ray is relaxed so as to reduce the occurrence of the off-axis aberrations. Other configurations of the Example 5 are the same as those of the Example 1.

The preferred embodiments of the present invention have been described above. It is to be noted, however, that the present invention is not limited only to these embodiments but various modifications and changes can be made within the scope of the gist of the invention. For example, in the case of a combination with the image display element such as the CRT and the LCD, electrical processing may also be applied to the image display element depending on the amount of distortion or the amount of lateral chromatic aberration.

Next, the Fresnel lens will be described with reference to FIGS. 12A to 12C. As shown in FIG. 12A, the Fresnel lens generally has such a shape that a lens surface having a curvature radius r is divided into multiple concentric regions. In this instance, the Fresnel lens has the shape in which the Fresnel gratings (prisms) FP having a serrated cross-sectional shape are arranged concentrically on a flat plane depending on the value of the curvature radius r. The concentric Fresnel gratings FP have angles different from one another or have the same angle. Meanwhile, grating pitches of the Fresnel gratings FP from the center (the optical axis) to the periphery are different from one another or are the same.

The curvature radius r on the Fresnel lens surface Fre corresponds to the curvature radius r of a lens surface shown in FIG. 12A. The curvature radius r is used as one of parameters to obtain the focal length of the Fresnel lens surface as with the typical case of obtaining a focal length of a lens. A focal length f, a plate thickness (a center thickness), the effective diameter $\phi 1$, and the like of the Fresnel lens are as shown in FIGS. 12B and 12C. The curvature radius of the Fresnel lens surface in the conditional expression to be described later adopts a curvature radius of a lens surface before being formed into the Fresnel shape (that is, a curvature radius of the central annular section).

Next, numerical value data of the respective Examples are shown below. In the numerical value data, reference sign i denotes an order of a surface counted from the observation plane, reference sign ri denotes a curvature radius of an i-th optical surface, reference sign di denotes a lens thickness or an air interval between the i-th surface and an i+1-th surface, and reference signs ni and vi denote a refractive index and an Abbe number of an optical member located between the i-th surface and the i+1-th surface regarding the d-line, respectively. Meanwhile, reference signs K, A4, A6, A8, A10, and the like described in aspheric surface data represent aspheric coefficients. When a displacement in the direction of the optical axis at a position of a height h from the optical axis is defined as x based on a surface vertex, the aspheric shape is defined by the following expression:

$$x=(h^2/R)/[1+\{1-(1+K)(h/R)^2\}^{1/2}]+A4h^4+A6h^6+A8h^8+A10h^{10}.$$

Note that reference sign R denotes the curvature radius. The Fresnel surface represents an ideal thin-profile state having an aspheric effect. As for an actual shape, the Fresnel surface is formed into the Fresnel shape within a center thickness d represented therein. The Fresnel surface is indicated with *Fre on the right of the corresponding surface number. Regarding the surface numbers in the respective set of the numerical value data, "1" corresponds to the observation plane (a stop) while "image plane" corresponds to the image display plane.

In numerical value data 1, surface numbers 2 and 3 correspond to the Fresnel lens LF while surface numbers 4 and 5 correspond to the positive lens LP. In numerical value data 2, surface numbers 2 and 3 correspond to the positive lens LP while surface numbers 6 and 7 correspond to the Fresnel lens LF. In numerical value data 3, surface numbers 4 and 5 correspond to the positive lens LP while surface numbers 6 and 7 correspond to the Fresnel lens LF. In numerical value data 4, surface numbers 2 and 3 correspond to the Fresnel lens LF while surface numbers 4 and 5 correspond to the positive lens LP. In numerical value data 5, surface numbers 2 and 3 correspond to the positive lens LP while surface numbers 4 and 5 correspond to the Fresnel lens LF.

A total lens length is a distance from a first lens surface on the observation plane side to the image display plane ID. Reference sign BF denotes a distance from the surface on the image display plane ID side to the image display plane. Meanwhile, relations of parameters based on the above-mentioned numerical value data with the respective conditional expressions are shown in Tables 1 and 2.

[Numerical value data 1]
(Unit mm)

Surface data

| Surface number | r | d | nd | vd | Effective diameter |
|---|---|---|---|---|---|
| 1(stop) | ∞ | (variable) | | | 3.50 |
| 2 | 100000.000 | 3.50 | 1.53110 | 56.0 | 48.76 |
| 3*Fre | −80.546 | 0.70 | | | 52.00 |
| 4* | 237.548 | 15.00 | 1.53110 | 56.0 | 53.30 |
| 5* | −36.019 | 40.89 | | | 55.34 |
| Image plane | ∞ | | | | |

Aspheric surface data

3rd surface

K = 0.00000e+000
A4 = −1.35561e−005
A6 = 2.66207e−008
A8 = −1.06533e−011

4th surface

K = 0.00000e+000
A4 = −2.18599e−005
A6 = 4.07744e−008
A8 = −2.04247e−011
A10 = 1.57785e−015

5th surface

K = 0.00000e+000
A4 = 2.20301e−006
A6 = −7.68945e−009
A8 = 1.19113e−011

Various data
Zoom ratio 1.00

| Focal length | 44.99 | 44.99 |
|---|---|---|
| F-number | 12.85 | 12.85 |
| Half angle of view (deg) | 55.00 | 45.00 |
| Image height | 43.00 | 36.35 |
| Total lens length | 70.09 | 70.09 |
| BF | 40.89 | 40.89 |
| d1 | 10.00 | 20.00 |
| Entrance pupil position | 0.00 | 0.00 |
| Exit pupil position | −37.93 | −88.19 |
| Front principal point position | 19.31 | 29.31 |
| Rear principal point position | −4.10 | −4.10 |

Zoom lens unit data

| Unit | Start surface | Focal length | Lens structure length | Front principal point position | Rear principal point position |
|---|---|---|---|---|---|
| 1 | 1 | ∞ | 0.00 | 0.00 | −0.00 |
| 2 | 2 | 44.99 | 19.20 | 9.31 | −4.10 |

Single lens data

| Lens | Start surface | Focal length |
|---|---|---|
| 1 | 1 | 151.54 |
| 2 | 4 | 60.03 |

[Numerical value data 2]
(Unit mm)

Surface data

| Surface number | r | d | nd | vd | Effective diameter |
|---|---|---|---|---|---|
| 1(stop) | ∞ | (variable) | | | 3.50 |
| 2* | ∞ | 11.72 | 1.48749 | 70.4 | 47.52 |
| 3* | −39.013 | 0.50 | | | 49.92 |
| 4 | −104.408 | 3.20 | 1.63400 | 23.9 | 55.12 |
| 5 | −550.468 | 0.50 | | | 61.09 |
| 6 | −550.000 | 5.00 | 1.53110 | 56.0 | 62.00 |
| 7*Fre | −55.766 | 60.66 | | | 68.33 |
| Image plane | ∞ | | | | |

Aspheric surface data

2nd surface

K = 0.00000e+000
A4 = 1.89729e−006
A6 = −8.84019e−010
A8 = −1.25103e−012
A10 = 1.57785e−015

3rd surface

K = 0.00000e+000
A4 = 8.01465e−006
A6 = −1.13123e−008
A8 = 6.33741e−012

7th surface

K = 0.00000e+000
A4 = −1.82721e−006
A6 = 2.98900e−009
A8 = −7.03142e−013

Various data
Zoom ratio 1.00

| Focal length | 63.48 | 63.48 |
|---|---|---|
| F-number | 18.14 | 18.14 |
| Half angle of view (deg) | 60.00 | 47.00 |
| Image height | 66.68 | 53.16 |
| Total lens length | 91.58 | 91.58 |
| BF | 60.66 | 60.66 |
| d1 | 10.00 | 20.00 |
| Entrance pupil position | 0.00 | 0.00 |
| Exit pupil position | −35.24 | −65.18 |
| Front principal point position | 21.46 | 31.46 |
| Rear principal point position | −2.82 | −2.82 |

Zoom lens unit data

| Unit | Start surface | Focal length | Lens structure length | Front principal point position | Rear principal point position |
|---|---|---|---|---|---|
| 1 | 1 | ∞ | 0.00 | 0.00 | −0.00 |
| 2 | 2 | 63.48 | 20.92 | 11.46 | −2.82 |

Single lens data

| Lens | Start surface | Focal length |
|---|---|---|
| 1 | 1 | 80.00 |
| 2 | 4 | −203.79 |
| 3 | 6 | 116.44 |

[Numerical value data 3]
(Unit mm)

Surface data

| Surface number | r | d | nd | vd | Effective diameter |
|---|---|---|---|---|---|
| 1(stop) | ∞ | (variable) | | | 3.50 |
| 2 | ∞ | 0.80 | 1.49000 | 55.0 | 47.43 |
| 3 | ∞ | 1.00 | | | 48.00 |
| 4* | −265.909 | 13.39 | 1.53110 | 56.0 | 49.38 |
| 5* | −36.393 | 0.20 | | | 54.33 |
| 6 | 1964.346 | 3.00 | 1.53110 | 56.0 | 67.88 |
| 7*Fre | −105.000 | 54.56 | | | 69.90 |
| Image plane | ∞ | | | | |

Aspheric surface data

4th surface

K = 0.00000e+000
A4 = −6.79879e−007
A6 = 4.81597e−009
A8 = −1.81252e−012

5th surface

K = 0.00000e+000
A4 = 2.76286e−006
A6 = −4.27243e−009
A8 = 8.19904e−012

Various data
Zoom ratio 1.00

| Focal length | 55.16 | 55.16 |
|---|---|---|
| F-number | 15.76 | 15.76 |
| Half angle of view (deg) | 57.50 | 47.50 |
| Image height | 55.41 | 47.21 |
| Total lens length | 82.96 | 82.96 |
| BF | 54.56 | 54.56 |
| d1 | 10.00 | 20.00 |
| Entrance pupil position | 0.00 | 0.00 |
| Exit pupil position | −36.31 | −75.00 |
| Front principal point position | 21.68 | 31.68 |
| Rear principal point position | −0.60 | −0.60 |

Zoom lens unit data

| Unit | Start surface | Focal length | Lens structure length | Front principal point position | Rear principal point position |
|---|---|---|---|---|---|
| 1 | 1 | ∞ | 0.00 | 0.00 | −0.00 |
| 2 | 2 | 55.16 | 18.39 | 11.68 | −0.60 |

Single lens data

| Lens | Start surface | Focal length |
|---|---|---|
| 1 | 1 | 0.00 |
| 2 | 4 | 77.81 |
| 3 | 6 | 187.76 |

[Numerical value data 4]
(Unit mm)

Surface data

| Surface number | r | d | nd | vd | Effective diameter |
|---|---|---|---|---|---|
| 1(stop) | ∞ | (variable) | | | 3.50 |
| 2*Fre | −129.970 | 1.20 | 1.63400 | 23.9 | 49.15 |
| 3 | ∞ | 0.46 | | | 50.00 |
| 4* | 976.710 | 20.02 | 1.53110 | 56.0 | 51.22 |
| 5 | −37.804 | 1.00 | | | 58.00 |

-continued

[Numerical value data 4]
(Unit mm)

| 6 | 1140.401 | 17.35 | 1.53110 | 56.0 | 73.16 |
| 7* | −58.000 | 47.34 | | | 75.91 |
| Image plane | ∞ | | | | |

Aspheric surface data

4th surface

K = 0.00000e+000
A4 = 3.80662e-006
A6 = −1.60330e-008
A8 = 1.45886e-011

7th surface

K = 0.00000e+000
A4 = 2.75248e-006
A6 = −1.49902e-009
A8 = 1.96913e-013

Various data
Zoom ratio 1.00

| Focal length | 51.11 | 51.11 | |
| F-number | 14.60 | 14.60 | |
| Half angle of view (deg) | 50.00 | 40.00 | |
| Image height | 45.06 | 37.39 | |
| Total lens length | 97.38 | 97.38 | |
| BF | 47.34 | 47.34 | |
| d1 | 10.00 | 20.00 | |
| Entrance pupil position | 0.00 | 0.00 | 0.00 |
| Exit pupil position | −88.54 | −235.84 | 3414.02 |
| Front principal point position | 31.88 | 41.88 | 51.88 |
| Rear principal point position | −3.77 | −3.77 | −3.77 |

Zoom lens unit data

| Unit | Start surface | Focal length | Lens structure length | Front principal point position | Rear principal point position |
|---|---|---|---|---|---|
| 1 | 1 | ∞ | 0.00 | 0.00 | −0.00 |
| 2 | 2 | 51.11 | 40.04 | 21.88 | −3.77 |

Single lens data

| Lens | Start surface | Focal length |
|---|---|---|
| 1 | 1 | −204.97 |
| 2 | 4 | 69.00 |
| 3 | 6 | 104.45 |

[Numerical value data 5]
(Unit mm)

Surface data

| Surface number | r | d | nd | vd | Effective diameter |
|---|---|---|---|---|---|
| 1(stop) | ∞ | (variable) | | | 3.50 |
| 2* | 4627.206 | 11.83 | 1.53110 | 56.0 | 48.02 |
| 3 | −45.008 | 1.00 | | | 49.95 |
| 4*Fre | −102.526 | 2.50 | 1.64000 | 23.5 | 57.04 |
| 5 | −500.000 | 1.20 | | | 58.01 |
| 6* | 122.504 | 9.67 | 1.53110 | 56.0 | 61.38 |
| 7 | −129.021 | 1.00 | | | 64.47 |
| 8 | 239.832 | 17.55 | 1.53110 | 56.0 | 71.66 |
| 9* | −72.370 | 31.51 | | | 73.45 |
| Image plane | ∞ | | | | |

-continued

[Numerical value data 5]
(Unit mm)

Aspheric surface data

2nd surface

K = 0.00000e+000
A4 = −4.61041e-006
A6 = 1.21044e-008
A8 = −3.52960e-012

4th surface

K = 0.00000e+000
A4 = 2.17893e-006
A6 = −2.20791e-010

6th surface

K = 0.00000e+000
A4 = −1.56415e-006
A6 = 1.72159e-009
A8 = −2.99784e-012

9th surface

K = 0.00000e+000
A4 = 6.74838e-007
A6 = −9.11601e-010
A8 = 6.34371e-014

Vrious data
Zoom ratio 1.00

| Focal length | 45.59 | 45.59 |
| F-number | 13.03 | 13.03 |
| Half angle of view (deg) | 50.00 | 41.00 |
| Image height | 38.30 | 30.80 |
| Total lens length | 86.26 | 86.26 |
| BF | 31.51 | 31.51 |
| d1 | 10.00 | 20.00 |
| Entrance pupil position | 0.00 | 0.00 |
| Exit pupil position | −89.84 | −260.05 |
| Front principal point position | 28.46 | 38.46 |
| Rear principal point position | −14.08 | −14.08 |

Zoom lens unit data

| Unit | Start surface | Focal length | Lens structure length | Front principal point position | Rear principal point position |
|---|---|---|---|---|---|
| 1 | 1 | ∞ | 0.00 | 0.00 | −0.00 |
| 2 | 2 | 45.59 | 44.75 | 18.46 | −14.08 |

Single lens data

| Lens | Start surface | Focal length |
|---|---|---|
| 1 | 1 | 84.00 |
| 2 | 4 | −202.01 |
| 3 | 6 | 119.92 |
| 4 | 8 | 106.76 |

TABLE 1

| Example | h1 | h0 | fh | F |
|---|---|---|---|---|
| 1 | 0.08000 | 2.40000 | 151.66000 | 45.00000 |
| 2 | 0.10000 | 2.50000 | 116.43900 | 63.48260 |
| 3 | 0.15000 | 1.50000 | 187.76600 | 55.16080 |
| 4 | 0.07000 | 0.77000 | −205.00000 | 51.10000 |
| 5 | 0.15000 | 0.45000 | −202.01400 | 45.59360 |

| Example | fp | φ0 | φ1 | d |
|---|---|---|---|---|
| 1 | 60.03160 | 31.14980 | 51.96000 | 19.20000 |
| 2 | 80.00000 | 32.37500 | 68.32860 | 20.92400 |
| 3 | 77.81470 | 35.36800 | 69.90000 | 16.59400 |

TABLE 1-continued

| | | | | |
|---|---|---|---|---|
| 4 | 69.00000 | 28.25180 | 49.15140 | 21.68000 |
| 5 | 84.00290 | 19.60000 | 57.04180 | 15.33010 |

| Example | L | (y − y0)/y0 | have | λ |
|---|---|---|---|---|
| 1 | 60.10430 | −0.21186 | 0.08000 | 0.00057856 |
| 2 | 81.58340 | −0.32284 | 0.10000 | 0.00057856 |
| 3 | 72.95820 | −0.20809 | 0.15000 | 0.00057856 |
| 4 | 87.37000 | −0.22960 | 0.07000 | 0.00057856 |
| 5 | 76.26090 | −0.27921 | 0.15000 | 0.00057856 |

| Example | w1 | we |
|---|---|---|
| 1 | 1.41400 | 0.69400 |
| 2 | 1.36600 | 0.20000 |
| 3 | 2.33000 | 0.42000 |
| 4 | 1.77000 | 0.36000 |
| 5 | 2.38000 | 1.39000 |

TABLE 2

| | Conditional expression | | | | | |
|---|---|---|---|---|---|---|
| Example | 1 | 2 | 3 | 4 | 5 | 6 |
| 1 | 0.033 | 0.599 | 3.370 | 1.334 | 0.319 | −0.998 |
| 2 | 0.040 | 0.474 | 1.834 | 1.260 | 0.256 | −1.226 |
| 3 | 0.100 | 0.506 | 3.404 | 1.411 | 0.227 | −0.899 |
| 4 | 0.091 | 0.575 | 4.012 | 1.350 | 0.248 | — |
| 5 | 0.333 | 0.344 | 4.431 | 1.842 | 0.201 | — |

| | Conditional expression | | | | | |
|---|---|---|---|---|---|---|
| Example | 7 | 8 | 9 | 10 | 11 | 12 |
| 1 | — | −0.737 | 138.274 | 2.037 | −0.212 | 0.811 |
| 2 | — | −0.999 | 172.843 | 6.830 | −0.323 | 0.788 |
| 3 | — | −1.317 | 259.264 | 5.548 | −0.208 | 0.786 |
| 4 | 1.000 | −0.925 | 120.990 | 4.917 | −0.230 | 0.801 |
| 5 | 1.516 | −0.981 | 259.264 | 1.712 | −0.279 | 0.718 |

According to the present invention, it is possible to obtain an observation optical system which enables observation of image information displayed on an image display plane at a wide viewing angle and with a high optical performance while reducing a size and a weight of the entire system, and to provide an observation apparatus including this observation optical system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An observation apparatus comprising:
an image display element configured to display image information; and
an observation optical system for observing the image information displayed on an image display plane of the image display element,
wherein the observation optical system comprises:
a Fresnel lens; and
a first positive lens provided on any of a light incident side and a light emitting side of the Fresnel lens, and
wherein following conditional expressions are satisfied:

$0.01 < h1/h0 < 0.80,$ $-0.33 < (y-y0)/y0 < -0.10;$ and $1.5 < |fH|/F < 5.0,$ where h0 represents a length in a direction of an optical axis from a surface vertex of a central annular section of the Fresnel lens to an end portion of the central annular section, h1 represents a length in the direction of the optical axis of a grating wall surface of a first annular section adjacent to the central annular section, y0 represents an ideal image height of the image display plane at an eye relief of 10 mm and at a half viewing angle of 45°, y represents an actual image height of the image display plane at the eye relief of 10 mm and at the half viewing angle of 45°, fH represents a focal length of the Fresnel lens, and F represents a focal length of the observation optical system.

2. The observation apparatus according to claim 1, wherein a following conditional expression is satisfied:

$0.3 < \phi 0/\phi 1 < 0.7,$ where φ0 represents a diameter of the central annular section and φ1 represents an effective diameter of the Fresnel lens.

3. The observation apparatus according to claim 1, wherein
the first positive lens is a positive lens having the largest refractive power among all positive lenses included in the observation optical system, and
a following conditional expression is satisfied:

$1.2 < fp/F < 2.0,$ where fp represents a focal length of the first positive lens and F represents a focal length of the observation optical system.

4. The observation apparatus according to claim 1, wherein a following conditional expression is satisfied:

$50.0 < have/\lambda < 500.0$  (9), where have represents an average value of lengths in the direction of the optical axis of grating wall surfaces within an effective surface of the Fresnel lens and λ represents a length of a wavelength of the d-line.

5. The observation apparatus according to claim 1, wherein a following conditional expression is satisfied: 1.2<w1/we<10.0, where w1 represents a grating width of the first annular section of the Fresnel lens along a diameter of the Fresnel lens and we represents a grating width of the outermost annular section within an effective surface of the Fresnel lens along a diameter of the Fresnel lens.

6. The observation apparatus according to claim 1, wherein the central annular section is formed from a continuous surface.

7. The observation apparatus according to claim 1, wherein a following conditional expression is satisfied:

$0.1 < d/L < 0.4,$ where d represents a distance on the optical axis from a lens surface on an observation plane side of a lens located closest to the observation plane side out of the first positive lens and the Fresnel lens, to a lens surface on an image display plane side of a lens located closest to the image display plane side out of the first positive lens and the Fresnel lens, and L represents a distance on the optical axis from the lens surface on the observation plane side of the lens located closest to the observation plane side to the image display plane.

8. The observation apparatus according to claim 1, wherein when the Fresnel lens has a positive refractive power, a following conditional expression is satisfied:

$-1.6 < (Rp12+Rp11)/(Rp12-Rp11) < -0.5,$ where Rp11 represents a curvature radius of a surface on an observation plane side of the Fresnel lens and Rp12 represents a curvature radius of a surface on an image display plane side of the Fresnel lens.

9. The observation apparatus according to claim 1, wherein when the Fresnel lens has a negative refractive power, a following conditional expression is satisfied:

$$0.8 < (Rn12+Rn11)/(Rn12-Rn11) < 1.7,$$

where Rn11 represents a curvature radius of a surface on an observation plane side of the Fresnel lens and Rn12 represents a curvature radius of a surface on an image display plane side of the Fresnel lens.

10. The observation apparatus according to claim 1, wherein a following conditional expression is satisfied:

$$-1.6 < (R22+R21)/(R22-R21) < -0.4,$$

where R21 represents a curvature radius of a lens surface on an observation plane side of the first positive lens and R22 represents a curvature radius of a lens surface on an image display plane side of the first positive lens.

11. The observation apparatus according to claim 1, wherein a following conditional expression is satisfied:

$$0.5 < y/F < 1.1,$$

where F represents a focal length of the observation optical system.

12. An observation apparatus comprising:
   an image display element configured to display image information; and
   an observation optical system for observing the image information displayed on an image display plane of the image display element,
   wherein the observation optical system comprises:
      a Fresnel lens; and
      a first positive lens provided on any of a light incident side and a light emitting side of the Fresnel lens, and
   wherein following conditional expressions are satisfied:

$$0.3 < \phi 0/\phi 1 < 0.7;$$

$$-0.33 < (y-y0)/y0 < -0.10; \text{ and}$$

$$1.5 < |fh|/F < 5.0,$$

where $\phi 0$ represents a diameter of a central annular section of the Fresnel lens, $\phi 1$ represents an effective diameter of the Fresnel lens, y0 represents an ideal image height of the image display plane at an eye relief of 10 mm and at a half viewing angle of 45°, y represents an actual image height of the image display plane at the eye relief of 10 mm and at the half viewing angle of 45°, fH represents a focal length of the Fresnel lens, and F represents a focal length of the observation optical system.

13. The observation apparatus according to claim 12, wherein a following conditional expression is satisfied:

$$0.5 < y/F < 1.1,$$

where F represents a focal length of the observation optical system.

14. An observation optical system for observing an image displayed on an image display plane of an image display element, the observation optical system comprising:
   a Fresnel lens; and
   a first positive lens provided on any of a light incident side and a light emitting side of the Fresnel lens,
   wherein following conditional expressions are satisfied:

$$0.01 < h1/h0 < 0.80; \text{ and}$$

$$0.12 < d/L < 0.35,$$

where h0 represents a length in a direction of an optical axis from a surface vertex of a central annular section of the Fresnel lens to an end portion of the central annular section, h1 represents a length in the direction of the optical axis of a grating wall surface of a first annular section adjacent to the central annular section, d represents a distance on the optical axis from a lens surface on an observation plane side of a lens located closest to the observation plane side out of the first positive lens and the Fresnel lens, to a lens surface on an image display plane side of a lens located closest to the image display plane side out of the first positive lens and the Fresnel lens, and L represents a distance on the optical axis from the lens surface on the observation plane side of the lens located closest to the observation plane side to the image display plane.

15. An observation optical system for observing an image displayed on an image display plane of an image display element, the observation optical system comprising:
   a Fresnel lens; and
   a first positive lens provided on any of a light incident side and a light emitting side of the Fresnel lens,
   wherein following conditional expressions are satisfied:

$$0.3 < \phi 0/\phi 1 < 0.7; \text{ and}$$

$$0.12 < d/L < 0.35;$$

where $\phi 0$ represents a diameter of a central annular section of the Fresnel lens, $\phi 1$ represents an effective diameter of the Fresnel lens, d represents a distance on an optical axis from a lens surface on an observation plane side of a lens located closest to the observation plane side out of the first positive lens and the Fresnel lens, to a lens surface on an image display plane side of a lens located closest to the image display plane side out of the first positive lens and the Fresnel lens, and L represents a distance on the optical axis from the lens surface on the observation plane side of the lens located closest to the observation plane side to the image display plane.

* * * * *